United States Patent
Duggal et al.

(10) Patent No.: US 11,386,776 B2
(45) Date of Patent: Jul. 12, 2022

(54) MANAGING A DRIVING CONDITION ANOMALY

(71) Applicant: QUALCOMM Incorporated, San Diego, CA (US)

(72) Inventors: Nakul Duggal, San Diego, CA (US); Ahmed Kamel Sadek, San Diego, CA (US); Anshuman Saxena, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 24 days.

(21) Appl. No.: 17/063,269

(22) Filed: Oct. 5, 2020

(65) Prior Publication Data

US 2022/0108604 A1 Apr. 7, 2022

(51) Int. Cl.
G08G 1/01 (2006.01)

(52) U.S. Cl.
CPC ......... *G08G 1/0133* (2013.01); *G08G 1/0112* (2013.01); *G08G 1/0141* (2013.01)

(58) Field of Classification Search
CPC ... G08G 1/0133; G08G 1/0141; G08G 1/0112
USPC .......... 340/933, 907, 988; 701/117, 118, 119
See application file for complete search history.

(56) References Cited

U.S. PATENT DOCUMENTS

| | | | |
|---|---|---|---|
| 10,507,841 B1 | 12/2019 | Singh et al. | |
| 10,885,539 B1 * | 1/2021 | Purgatorio | B60W 40/09 |
| 2002/0152015 A1 * | 10/2002 | Seto | B60K 31/0008 |
| | | | 123/352 |
| 2007/0027583 A1 * | 2/2007 | Tamir | G07C 5/008 |
| | | | 701/1 |
| 2016/0371973 A1 * | 12/2016 | Holleczek | H04W 4/029 |
| 2017/0088145 A1 * | 3/2017 | Gordon | G05D 1/0061 |
| 2017/0161569 A1 * | 6/2017 | Ren | G06V 20/582 |
| 2018/0136644 A1 * | 5/2018 | Levinson | G01S 7/4972 |
| 2019/0056231 A1 | 2/2019 | Bai et al. | |
| 2019/0066410 A1 | 2/2019 | Buchholz et al. | |
| 2019/0220011 A1 * | 7/2019 | Della Penna | G06F 8/65 |
| 2020/0160626 A1 | 5/2020 | Lei et al. | |
| 2020/0400440 A1 * | 12/2020 | Stenneth | G01C 21/3848 |
| 2021/0134085 A1 * | 5/2021 | Hu | G06N 3/0454 |

(Continued)

FOREIGN PATENT DOCUMENTS

WO 2020092635 A1 5/2020

OTHER PUBLICATIONS

International Search Report and Written Opinion—PCT/US2021/043321—ISA/EPO—dated Nov. 16, 2021, 15 pages.

*Primary Examiner* — Naomi J Small
(74) *Attorney, Agent, or Firm* — The Marbury Law Group, PLLC

(57) ABSTRACT

Embodiments include methods performed by a processor of a vehicle control unit for managing a driving condition anomaly. In some embodiments, the vehicle may receive a first driving condition based on data from a first vehicle sensor, receive a second driving condition based on data from another data source, determine a driving condition anomaly based on the first driving condition and the second driving condition, send a request for information to a driving condition database remote from the vehicle, receive the requested information from the driving condition database, and resolve the driving condition anomaly based on the requested information from the driving condition database.

24 Claims, 18 Drawing Sheets

(56) References Cited

U.S. PATENT DOCUMENTS

2021/0206395 A1* 7/2021 Guo .................. B60W 60/0057
2021/0263145 A1* 8/2021 Wang .................... G01S 13/343

* cited by examiner

MANAGING A DRIVING CONDITION ANOMALY

BACKGROUND

Autonomous and semi-autonomous vehicles perceive the world around them by analyzing data from sensors (such as cameras, radar, and lidar) with sophisticated neural networks. The output of such neural networks enables autonomous and semi-autonomous vehicles to make extremely rapid determinations about conditions around the vehicle, which vehicles may use to make decisions about maneuvering, path planning, and other vehicle operations.

However, it has been shown that such neural networks may be vulnerable to slight perturbations in their information inputs. For example, adding noise to the input of the camera or making slight changes in an object's appearance may result in large changes in the output of the neural network. In some cases, the inputs may even be deliberately altered by a prankster or a bad actor. The resulting altered neural network output may cause the vehicle to behave in an undesired manner.

SUMMARY

Various aspects include methods performed by a vehicle, such as an autonomous or semi-autonomous vehicle, and/or by communication networks distributed along highways, such as Edge computing device(s), for managing driving condition anomalies by providing vehicle systems with supplemental information regarding driving condition anomalies in the vicinity of the vehicle.

Various aspects performed by a processor of a vehicle control unit may include receiving a first driving condition based on data from a first vehicle sensor of a vehicle, receiving a second driving condition based on data from another data source, determining a driving condition anomaly based on the first driving condition and the second driving condition, sending a request for information to a driving condition database remote from the vehicle, receiving the requested information from the driving condition database, and resolving the driving condition anomaly based on the requested information from the driving condition database. Some aspects may further include sending the driving condition anomaly to the driving condition database. In some aspects, the first driving condition and the second driving condition may be one or more of traffic sign information, traffic light information, a speed limit, a road condition, a traffic condition, observed behavior of a second vehicle, observed behavior of a person outside the vehicle, information from a navigation system, information from an electronic map, an instruction received from an autonomous maneuvering system of the vehicle, and an instruction received from an intelligent traffic system (ITS). In some aspects, the other data source may be a high definition may or a second vehicle sensor.

In some aspects, determining a driving condition anomaly based on the first driving condition and the second driving condition may include determining the driving condition anomaly in response to determining that a difference between the first driving condition and the second driving condition exceeds a threshold. In some aspects, determining a driving condition anomaly based on the first driving condition and the second driving condition may include determining the driving condition anomaly in response to determining that the first driving condition exceeds a condition threshold based on the second driving condition. In some aspects, determining a driving condition anomaly based on the first driving condition and the second driving condition may include determining the driving condition anomaly in response to determining that the first driving condition contradicts an aspect of the second driving condition.

In some aspects, resolving the driving condition anomaly based on the requested information from the driving condition database may include determining that the driving condition anomaly is caused by an error in the first driving condition, and refraining from using the first driving condition for vehicle operations in response to determining that the driving condition anomaly is caused by an error in the first driving condition. In some aspects, resolving the driving condition anomaly based on the requested information from the driving condition database may include reducing a weight associated with the first driving condition. In some aspects, resolving the driving condition anomaly based on the requested information from the driving condition database may include substituting the second driving condition for the first driving condition.

In some aspects, receiving a first driving condition based on first vehicle sensor data and a second driving condition based on data from another data source may include applying the data from a first vehicle sensor to a first neural network, receiving as output from the first neural network the first driving condition, applying information from the other data source to a second neural network, and receiving as output from the second neural network the second driving condition.

In some aspects, sending a request for information to a driving condition database remote from the vehicle may include sending to the driving condition database one or more of a location of the vehicle, a speed of the vehicle, a planned path of the vehicle, and a radius from the vehicle. In some aspects, sending a request for information to a driving condition database remote from the vehicle may include sending the request for information to an Edge computing device.

Further aspects may include a vehicle having a processor configured to perform one or more operations of the methods summarized above. Further aspects may include a non-transitory processor-readable storage medium having stored thereon processor-executable instructions configured to cause a processor of a vehicle control unit to perform operations of the methods summarized above. Further aspects include a mobile device having means for performing functions of the methods summarized above. Further aspects include a system on chip for use in a vehicle that includes a processor configured to perform one or more operations of the methods summarized above.

Various aspects include methods performed by an Edge computing device for managing a driving condition anomaly. Such aspects may include receiving information about a driving condition anomaly from a first vehicle, incorporating the information about the driving condition anomaly into a driving condition database, determining whether the driving condition anomaly exceeds a warning threshold, and sending information about the driving condition anomaly to a second vehicle in response to determining that the driving condition anomaly exceeds the warning threshold.

In some aspects, sending information about the driving condition anomaly to a second vehicle in response to determining that the driving condition anomaly exceeds the warning threshold may include determining whether the second vehicle is within a warning radius of the driving condition anomaly, and sending the information about the driving condition anomaly to a second vehicle in response to determining that the second vehicle is within the warning radius of the driving condition anomaly.

In some aspects, incorporating the information about the driving condition anomaly into a driving condition database may include performing an authentication operation to determine whether the first vehicle is authorized to provide the information about the driving condition anomaly, and incorporating the information about the driving condition anomaly into a driving condition database in response to determining that the first vehicle is authorized to provide the information about the driving condition anomaly.

Further aspects may include an Edge computing device having a processor configured to perform one or more operations of the methods summarized above. Further aspects may include a non-transitory processor-readable storage medium having stored thereon processor-executable instructions configured to cause a processor of an Edge computing device to perform operations of the methods summarized above. Further aspects include an Edge computing device having means for performing functions of the methods summarized above. Further aspects include a system on chip for use in an Edge computing device that includes a processor configured to perform one or more operations of the methods summarized above.

BRIEF DESCRIPTION OF THE DRAWINGS

The accompanying drawings, which are incorporated herein and constitute part of this specification, illustrate exemplary embodiments of the claims, and together with the general description given above and the detailed description given below, serve to explain the features of the claims.

DETAILED DESCRIPTION

Figure 1A:
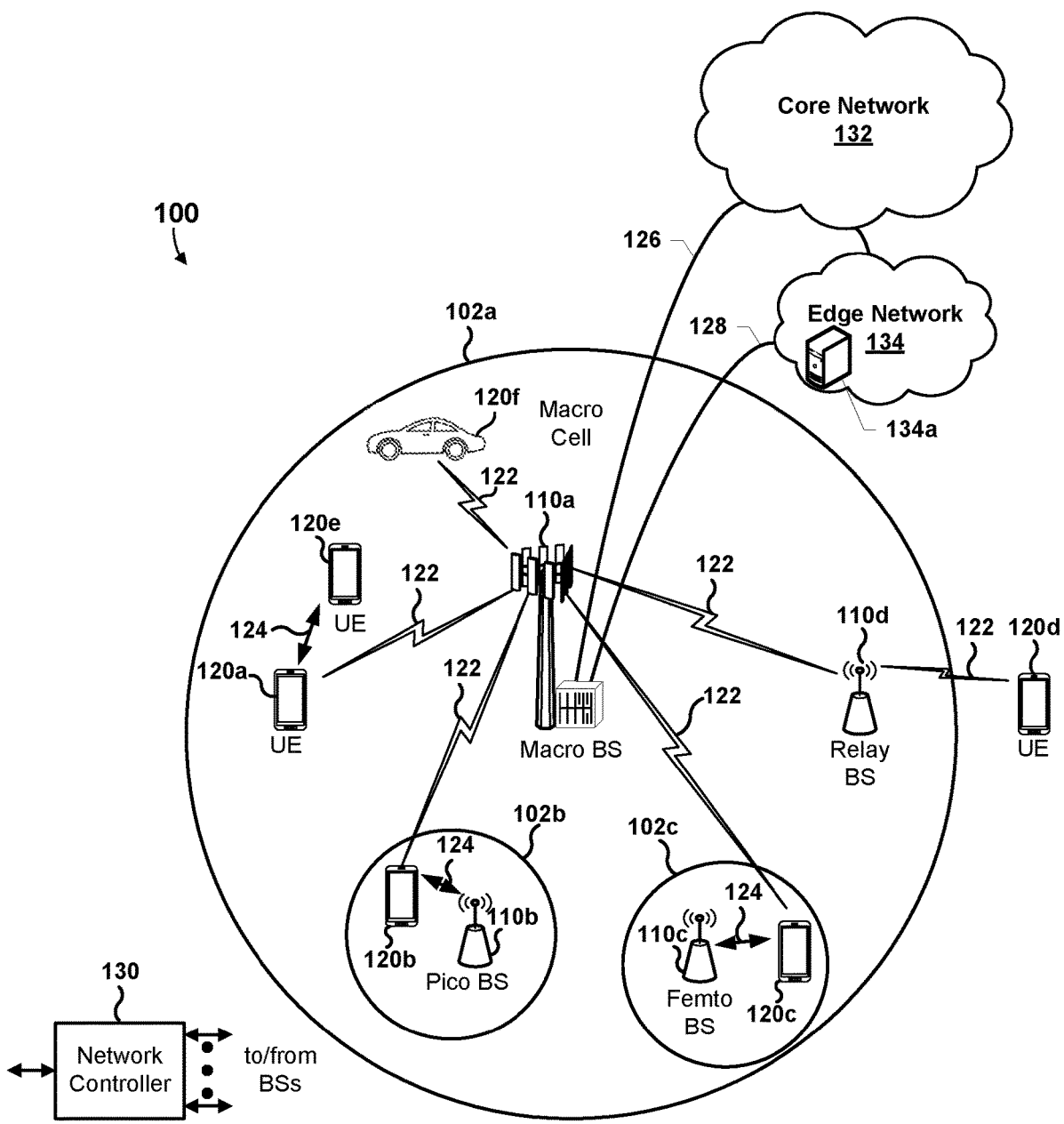
FIG. 1A is a system block diagram illustrating an example communications system suitable for use with various embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Various aspects include methods performed by a vehicle, such as such as an autonomous or semi-autonomous vehicle, and/or by communication networks distributed along highways, such as Edge computing device, for managing driving condition anomalies by providing vehicle systems with supplemental information regarding driving condition anomalies in the vicinity of the vehicle. Such systems and methods may provide autonomous and semi-autonomous vehicles with robust defenses against adversarial attacks and vulnerabilities in deep learning by autonomous driving vehicle systems.

The term "vehicle control unit" is used herein to refer to one or more computing devices including or coupled to wireless communication elements within autonomous and/or semiautonomous vehicles or other mobile platforms and/or similar electronic systems that include a memory, wireless communication components and a programmable processor.

The term "system on chip" (SOC) is used herein to refer to a single integrated circuit (IC) chip that contains multiple resources and/or processors integrated on a single substrate. A single SOC may contain circuitry for digital, analog, mixed-signal, and radio-frequency functions. A single SOC may also include any number of general purpose and/or specialized processors (digital signal processors, modem processors, video processors, etc.), memory blocks (e.g., ROM, RAM, Flash, etc.), and resources (e.g., timers, voltage regulators, oscillators, etc.). SOCs may also include software for controlling the integrated resources and processors, as well as for controlling peripheral devices.

The term "system in a package" (SIP) may be used herein to refer to a single module or package that contains multiple resources, computational units, cores and/or processors on two or more IC chips, substrates, or SOCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP may also include multiple independent SOCs coupled together via high speed communication circuitry and packaged in close proximity, such as on a single motherboard or in a single vehicle control unit. The proximity of the SOCs facilitates high speed communications and the sharing of memory and resources.

The terms "Edge computing," "Edge network," and "Edge computing device" are used herein to refer to a computer system or network that includes one or more computing devices (e.g., server computing devices) outside of a core network, physically located closer to endpoint devices, such as vehicle control units within vehicles. Edge computing refers to computing or processing that is performed outside of a core network in Edge computing devices and/or by applications executing on Edge computing devices configured to rapidly provide computing services to endpoint devices. An Edge network may include one or more Edge server devices configured to perform services such as processing operations, execution of applications, content caching, data storage, and other such services at the edge of a network, in relatively close proximity to the endpoint device (as compared to much more distant server devices in a core network or "cloud") in order to provide faster communication times, faster information transfer rates, and lower latency.

As used herein, the terms "network," "system," "wireless network," "cellular network," and "wireless communication network" may interchangeably refer to a portion or all of a wireless network of a carrier associated with a vehicle control unit and/or subscription on a vehicle control unit. The techniques described herein may be used for various wireless communication networks, such as Code Division Multiple Access (CDMA), time division multiple access (TDMA), FDMA, orthogonal FDMA (OFDMA), single carrier FDMA (SC-FDMA) and other networks. In general, any number of wireless networks may be deployed in a given geographic area. Each wireless network may support at least one radio access technology, which may operate on one or more frequency or range of frequencies. For example, a CDMA network may implement Universal Terrestrial Radio Access (UTRA) (including Wideband Code Division Multiple Access (WCDMA) standards), CDMA2000 (including IS-2000, IS-95 and/or IS-856 standards), etc. In another example, a TDMA network may implement GSM Enhanced Data rates for GSM Evolution (EDGE). In another example, an OFDMA network may implement Evolved UTRA (E-UTRA) (including LTE standards), Institute of Electrical and Electronics Engineers (IEEE) 802.11 (WiFi), IEEE 802.16 (WiMAX), IEEE 802.20, Flash-OFDM®, etc. Reference may be made to wireless networks that use LTE standards, and therefore the terms "Evolved Universal Terrestrial Radio Access," "E-UTRAN" and "eNodeB" may also be used interchangeably herein to refer to a wireless network. However, such references are provided merely as examples, and are not intended to exclude wireless networks that use other communication standards. For example, while various Third Generation (3G) systems, Fourth Generation (4G) systems, and Fifth Generation (5G) systems are discussed herein, those systems are referenced merely as examples and future generation systems (e.g., sixth generation (6G) or higher systems) may be substituted in the various examples.

Autonomous and semi-autonomous vehicles use the output of neural networks to make determinations about conditions around the vehicle, and in turn to use such determinations to make decisions about maneuvering, path planning, and other vehicle operations. The neural networks may be vulnerable to slight changes in their information inputs, such as noise, in the input of the camera, changes in an object's appearance, and the like. In some cases, objects, signs, or other conditions may be altered, such as deliberately altered by a bad actor or not deliberately altered (e.g., snow covering part of a street sign). The resulting altered neural network output may cause the vehicle to behave in an undesired manner.

Various embodiments provide methods and computing devices configured to perform the methods that provide robustness against intentional or unintentional perturbations in the inputs to a neural network for autonomous and semi-autonomous vehicles. Various embodiments may include methods and computing devices configured to perform the methods for detecting and managing a driving condition anomaly. Various embodiments may include receiving a first driving condition based on data from a first vehicle sensor and a second driving condition based on data from another data source, determining a driving condition anomaly based on the first driving condition and the second driving condition, sending a request for information to a driving condition database remote from the vehicle, receiving the requested information from the driving condition database, and resolving the driving condition anomaly based on the requested information from the driving condition database.

In some embodiments, the first driving condition and the second driving condition each may include one of traffic sign information, traffic light information, a speed limit, a road condition, a traffic condition, observed behavior of a second vehicle, observed behavior of a person outside the vehicle, information from a navigation system, information from an electronic map, an instruction received from an autonomous maneuvering system of the vehicle, and/or an instruction received from an intelligent traffic system (ITS). In some embodiments, the other data source may include a high-definition (HD) map. In some embodiments, the other data source may include a second vehicle sensor. In some embodiments, the other data source may be both a high-definition map and a second vehicle sensor. In some embodiments, the other data source may be any suitable source(s) of data.

In some embodiments, the vehicle may apply the data from the first vehicle sensor to a first neural network and may receive as output from the first neural network the first driving condition. In some embodiments the vehicle may apply information from the other data source to a second neural network and may receive as output from the second neural network the second driving condition. In some embodiments, the first neural network and the second neural network may be different types of neural networks. For example, the first neural network may be an image recognition algorithm, which may be easier to fool or spoof, and the second neural network may be a deep learning algorithm, which may be more difficult to fool.

In some embodiments, the vehicle may send the request for information to the driving condition database including or with one or more of a location of the vehicle, a speed of the vehicle, a planned path of the vehicle, and a radius from the vehicle. The driving condition database may provide information relevant to the vehicle based on such information. In some embodiments, the vehicle may send the request for information to an Edge computing device. In some embodiments, the driving condition database may be managed by an Edge computing device in order to provide extremely rapid responses to vehicle requests.

In some embodiments, the driving condition database may include "crowdsourced" information about real-time conditions that are observed by and received from a plurality of sources. Such sources may include vehicles, road-side units (RSUs), traffic cameras and other traffic sensors, vehicle control units such as Internet of Things (IoT) sensors and mobile phones, and/or other suitable devices. In some embodiments, the driving condition database may include information that is updated in real-time or near-real-time to include detailed driving condition information that is typically unavailable from digital maps or navigation systems. In some embodiments, the vehicle may receive information from the driving condition database via a wired (e.g., when the car is parked or otherwise motionless) or wireless (e.g., via Wi-Fi or cellular) network communication link. In some embodiments a 5G communication link may provide a very low latency and highly reliable communication link (e.g., Ultra-Low Latency Reliable Communication). In some embodiments, the driving condition database may be included in a high-definition (HD) map (such as a commercial HD map), or may be included with a network navigation service such as Google Maps.

In various embodiments, a vehicle may use information from the driving condition database to doublecheck information from a sensor of the vehicle or to doublecheck an output of a neural network of the vehicle. For example, the processor may receive from a neural network an output based on the neural network's detection and classification of a traffic rule (e.g., from an observation of a speed limit sign by a vehicle sensor), and then the processor may check information from the driving condition database about the speed limit on that road.

In some embodiments, the driving condition database may include a semantic layer that includes information that may vary according to a variable condition, such as time, location, observed conditions (e.g., weather), or another variable condition. For example, the driving condition database may include different speed limits per road lane based on the time of day (and/or day of week), direction of lanes based on traffic patterns. In some embodiments, the driving condition database may include parameters that indicate permitted driving activity or behavior in a location. Such parameters may be simple or complex. For example, a parameter may include a speed limit in an area or on a road. As another example, a parameter may include a correlation of information, for example, a downtown area typically has many pedestrians walking to work between 8 am and 10 am, and a "safe" or "reasonable" vehicle speed in that location during that time is 20 MPH, even though the marked speed limit is 35 MPH. However, on weekends or holidays, fewer pedestrians may be present at those times. As another example, the driving condition database may include information indicating different speed limits per lane based on the time of day or observed traffic behavior. As another example, the driving condition database may include different traffic directions of lanes based on traffic patterns, time of day, day of week, traffic density, an observation of the presence of movable road dividers, an observation (or historical data about) dynamic traffic signs, weather conditions, road conditions, local event conditions, and the like. Other examples of simple or complex parameters are also possible. Thus, the information available from the driving condition database may be highly dynamic and current based on observations reported by a plurality of devices. The information in the driving condition database also may be based on historical information. In some embodiments, the driving condition database may include parameters indexed by location, which may be highly specific to a location or "hyperlocal" parameters.

In some embodiments, a vehicle control unit may determine a driving condition anomaly based on the first driving condition and the second driving condition. In some embodiments, the vehicle control unit may determine the driving condition anomaly in response to determining that a difference between the first driving condition and the second driving condition exceeds a threshold. For example, the vehicle control unit may determine that a speed limit sign indicates a speed limit of 55 MPH (a first driving condition) and the vehicle control unit may observe that other vehicles are moving at 25 MPH (a second driving condition). The vehicle control unit may determine that the difference between the first driving condition and the second driving condition exceeds a threshold. In response to determining that the difference between the first driving condition and the second driving condition exceeds the threshold, the vehicle control unit may determine that the first driving condition may be a driving condition anomaly. In some embodiments, the threshold may include a simple condition, such as a difference of 25 MPH (or other value) between the first driving condition and the second driving condition. In some embodiments, the threshold may be the result of multi-factor or multi-level determination, such as an output of a neural network.

In some embodiments, the vehicle control unit may determine the driving condition anomaly in response to determining that the first driving condition exceeds a condition threshold based on the second driving condition. For example, the vehicle control unit may determine that a speed limit sign reads 85 MPH (a first driving condition) and the vehicle control unit may determine that the vehicle is in a construction zone (a second driving condition), where the prescribed speed is generally much lower. As another example, the vehicle control unit may set an autopilot speed (a first driving condition), such as based on sign detection, user input, or another suitable determination or source of the autopilot speed, which may lead to or cause the vehicle to behave in an undesirable manner (a second driving condition) due to external conditions of vehicle performance. Some non-limiting examples of an undesirable second driving conduction that the vehicle control unit may determine or recognize include: the vehicle moving too fast on a windy road (e.g., for passenger comfort); the vehicle moving too fast on a wet or icy road (e.g., for vehicle safety); the vehicle approaching closely to (i.e., within a threshold distance) or crossing over a lane line or lane marker; the vehicle approaching closely to (i.e., within a threshold distance) a road edge; the vehicle approaching another vehicle within a threshold distance or closing rate; the vehicle is deviating beyond a threshold from a center point of the lane; the vehicle's tires are losing traction beyond a threshold; and vehicle slew, skid, or other similar movements. In some embodiments, the vehicle control unit may determine that, based on one or more aspects of the second driving condition, the first driving condition may be a driving condition anomaly. In some embodiments, the second driving condition may include one or more elements, such as a road sign indicating the second driving condition (e.g., "construction ahead"), one or more people or objects outside the vehicle indicating the second driving condition (e.g., a flag man, construction equipment, construction vehicles, safety barriers, etc.).

In some embodiments, the vehicle control unit may determine the driving condition anomaly in response to determining that the first driving condition contradicts an aspect of the second driving condition. For example, the vehicle control unit may determine that a speed limit sign reads 85 MPH (a first driving condition) and the vehicle control unit may determine that map data (e.g., from an HD map) indicates that the speed limit along that road is 35 MPH (a second driving condition). In such embodiments, in response to determining that the first driving condition contradicts the second driving condition, the vehicle control unit may determine that the first driving condition may be a driving condition anomaly. In some embodiments, the threshold may be the result of multi-factor or multi-level determination, such as an output of a neural network.

In some embodiments, the vehicle control unit may resolve the driving condition anomaly by determining that the driving condition anomaly is caused by an error in or associated with the first driving condition. In some embodiments, the vehicle control unit may refrain from using the first driving condition for vehicle operations in response to determining that the driving condition anomaly is caused by an error in the first driving condition. For example, the vehicle control unit may determine that the perception that a speed limit sign reads 85 MPH is incorrect, and the vehicle control unit may ignore or otherwise refrain from using that perceived information in maneuvering decisions.

In some embodiments, the vehicle control unit may assign less weight to the first driving condition in response to determining that the driving condition anomaly is caused by an error in the first driving condition. For example, in a scenario in which the vehicle control unit receives and processes numerous inputs including vehicle speed, the vehicle control unit may reduce a weight or other value associated with the first driving condition so as to resolve the driving condition anomaly. For example, the vehicle control unit may reduce a weight associated with the first driving condition (e.g., 85 MPH speed limit) by a factor, an offset, a percentage, or another suitable reduction. As another example, the vehicle control unit may iteratively reduce a value of the first driving condition, such substitute a first slower speed, then a second slower speed, etc. for the initial determination of 85 MPH, and continue such substitutions until the reduced value of the first driving condition resolves the driving condition anomaly. As another example, the vehicle control unit may substitute the second driving condition for the first driving condition (i.e., use the second driving condition instead of the first driving condition).

In some embodiments, the vehicle control unit may send the first driving condition to the driving condition database. In some embodiments, the vehicle control unit may send the driving condition anomaly to the driving condition database.

Various embodiments provide methods and computing devices configured to perform the methods performed by a processor of an Edge computing device for managing a driving condition anomaly. Various embodiments may include receiving information about a driving condition anomaly from a first vehicle, incorporating the information about the driving condition anomaly into a driving condition database, determining whether the driving condition anomaly exceeds a warning threshold, and sending information about the driving condition anomaly to a second vehicle in response to determining that the driving condition anomaly exceeds the warning threshold.

In some embodiments, the Edge computing device may determine whether the second vehicle is within a warning radius of the driving condition anomaly. The Edge computing device may send the information about the driving condition anomaly to the second vehicle in response to determining that the second vehicle is within the warning radius of the driving condition anomaly. In some embodiments, the Edge computing device may send the information about the driving condition anomaly to all (or multiple) vehicles in an area (e.g., a metropolitan area, a county, a district, etc.). In some embodiments, the Edge computing device may send the information about the driving condition anomaly to vehicles within a radius from the driving condition anomaly. In some embodiments, the Edge computing device may send the information about the driving condition anomaly to the second vehicle based on a planned path of the second vehicle (e.g., the planned path of the second vehicle is within a radius of the driving condition anomaly). In some embodiments, the Edge computing device may send the information about the driving condition anomaly to the second vehicle based on a speed of the second vehicle (e.g., based on the speed of the second vehicle, the second vehicle will enter a radius of the driving condition anomaly within a period of time).

In some embodiments, under some conditions the Edge computing device may refrain from sending the information about the driving condition anomaly to the second vehicle despite the second vehicle being within the warning radius. For example, the Edge computing device may determine that the second vehicle is traveling in an opposite direction, is leaving the warning radius, or otherwise is unlikely. For example, the Edge computing device may determine how likely a vehicle will encounter or be affected by the driving condition anomaly even though the vehicle is within the warning radius, and if the determined likelihood or probability is less than a threshold probability, the Edge computing device may not send the information about the driving condition anomaly to that vehicle. In such embodiments, the Edge computing device may filter the second vehicle out of a group of vehicles to which the Edge computing device will send the information about the driving condition anomaly.

In some embodiments, the Edge computing device may perform an authentication operation to determine whether the first vehicle control unit is authorized to provide the information about the driving condition anomaly. The Edge computing device may incorporate the information about the driving condition anomaly into a driving condition database in response to determining that the first vehicle control unit is authorized to provide the information about the driving condition anomaly. In some embodiments, the first vehicle control unit must present authentication credentials or log into a verified account in order to be permitted to provide the information about the driving condition anomaly. Thus, various embodiments may protect the integrity of the information in the driving condition database.

Various embodiments improve the operation of vehicles by enabling vehicle control units to determine a driving condition anomaly that may be caused by an inaccurate machine perception and to mitigate inaccurate responses by the vehicle. Various embodiments improve the operation of vehicles by providing a warning of a driving condition anomaly to other vehicles. Various embodiments improve the operation of vehicles by leveraging Edge computing resources to determine driving condition information that is relevant to particular vehicles and to use that driving condition information to doublecheck machine perceptions of a vehicle.

FIG. 1A illustrates an example of a communications system 100 that is suitable for implementing various embodiments. The communications system 100 may be an 5G NR network, or any other suitable communication network (e.g., 4G LTE, 3G, etc.). While FIG. 1 illustrates a 5G network, later generation networks may include the same or similar elements. Therefore, the reference to a 5G network and 5G network elements in the following descriptions is for illustrative purposes and is not intended to be limiting.

The communications system 100 may include a heterogeneous network architecture that includes a core network 132 and a variety of wireless devices and vehicles configured with vehicle control units (illustrated as wireless device and vehicles 120a-120f in FIG. 1). The communications system 100 may include an Edge network 134 to provide network computing resources in proximity to the wireless device and vehicle control units. The Edge network 134 may include one or more Edge computing devices 134a. The communications system 100 may also include a number of base stations (illustrated as the BS 110a, the BS 110b, the BS 110c, and the BS 110d) and other network entities. A base station is an entity that communicates with wireless device and vehicle control units, and also may be referred to as a NodeB, an LTE evolved nodeB (eNB), an access point (AP), a radio head, a transmit receive point (TRP), a New Radio base station (NR BS), a 5G NodeB (NB), a Next Generation NodeB (gNodeB or gNB), or the like. Each base station may provide communication coverage for a particular geographic area. In 3GPP, the term "cell" can refer to a coverage area of a base station, a base station subsystem serving this coverage area, or a combination thereof, depending on the context in which the term is used. The core network 132 may be any type core network, such as an LTE core network (e.g., an EPC network), 5G core network, etc.

A base station 110a-110d may provide communication coverage for a macro cell, a pico cell, a femto cell, another type of cell, or a combination thereof. A macro cell may cover a relatively large geographic area (for example, several kilometers in radius) and may allow unrestricted access by wireless device and vehicle control units with service subscription. A pico cell may cover a relatively small geographic area and may allow unrestricted access by wireless device and vehicle control units with service subscription. A femto cell may cover a relatively small geographic area (for example, a home) and may allow restricted access by wireless device and vehicle control units having association with the femto cell (for example, wireless devices in a closed subscriber group (CSG)). A base station for a macro cell may be referred to as a macro BS. A base station for a pico cell may be referred to as a pico BS. A base station for a femto cell may be referred to as a femto BS or a home BS. In the example illustrated in FIG. 1, a base station 110a may be a macro BS for a macro cell 102a, a base station 110b may be a pico BS for a pico cell 102b, and a base station 110c may be a femto BS for a femto cell 102c. A base station 110a-110d may support one or multiple (for example, three) cells. The terms "eNB", "base station", "NR BS", "gNB", "TRP", "AP", "node B", "5G NB", and "cell" may be used interchangeably herein.

In some examples, a cell may not be stationary, and the geographic area of the cell may move according to the location of a mobile base station. In some examples, the base stations 110a-110d may be interconnected to one another as well as to one or more other base stations or network nodes (not illustrated) in the communications system 100 through various types of backhaul interfaces, such as a direct physical connection, a virtual network, or a combination thereof using any suitable transport network The base station 110a-110d may communicate with the core network 132 over a wired or wireless communication link 126. The base station 110a-110d may communicate with the Edge network 134 (e.g., with the one or more Edge computing device 134a) over a wired or wireless communication link 128. The wireless device and vehicle control units 120a-120f may communicate with the base station 110a-110d over a wireless communication link 122.

The communications system 100 also may include relay stations (e.g., relay BS 110d). A relay station is an entity that can receive a transmission of data from an upstream station (for example, a base station or a wireless device) and send a transmission of the data to a downstream station (for example, wireless device and vehicle control units or a base station). A relay station also may be a wireless device that can relay transmissions for other wireless device and vehicle control units. In the example illustrated in FIG. 1, a relay station 110d may communicate with macro the base station 110a and the wireless device and vehicle control units 120d in order to facilitate communication between the base station 110a and the wireless device and vehicle control units 120d. A relay station also may be referred to as a relay base station, a relay base station, a relay, etc.

The communications system 100 may be a heterogeneous network that includes base stations of different types, for example, macro base stations, pico base stations, femto base stations, relay base stations, etc. These different types of base stations may have different transmit power levels, different coverage areas, and different impacts on interference in communications system 100. For example, macro base stations may have a high transmit power level (for example, 5 to 40 Watts) whereas pico base stations, femto base stations, and relay base stations may have lower transmit power levels (for example, 0.1 to 2 Watts).

A network controller 130 may couple to a set of base stations and may provide coordination and control for these base stations. The network controller 130 may communicate with the base stations via a backhaul. The base stations also may communicate with one another, for example, directly or indirectly via a wireless or wireline backhaul.

In some embodiments, the communication links 126 and 128 may use a variety of wired systems (e.g., Ethernet, TV cable, telephony, fiber optic and other forms of physical network connections) that may use one or more wired communication protocols, such as Ethernet, Point-To-Point protocol, High-Level Data Link Control (HDLC), Advanced Data Communication Control Protocol (ADCCP), and Transmission Control Protocol/Internet Protocol (TCP/IP).

In some embodiments, the communication links 122, 124, 126, and 128 may be wireless communication links. Such wireless communication links may include a plurality of carrier signals, frequencies, or frequency bands, each of which may include a plurality of logical channels. The wireless communication links 122, 124, 126, and 128 may utilize one or more radio access technologies (RATs). Examples of RATs that may be used in a wireless communication link include 3GPP LTE, 3G, 4G, 5G (e.g., NR), GSM, Code Division Multiple Access (CDMA), Wideband Code Division Multiple Access (WCDMA), Worldwide Interoperability for Microwave Access (WiMAX), Time Division Multiple Access (TDMA), and other mobile telephony communication technologies cellular RATs. Further examples of RATs that may be used in one or more of the various wireless communication links 122, 124, 126, and 128 within the communication system 100 include medium range protocols such as Wi-Fi, LTE-U, LTE-Direct, LAA, MuLTEfire, and relatively short range RATs such as ZigBee, Bluetooth, and Bluetooth Low Energy (LE).

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block") may be 12 subcarriers (or 180 kHz). Consequently, the nominal Fast File Transfer (FFT) size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While descriptions of some embodiments may use terminology and examples associated with LTE technologies, various embodiments may be applicable to other wireless communications systems, such as a new radio (NR) or 5G network. NR may utilize OFDM with a cyclic prefix (CP) on the uplink (UL) and downlink (DL) and include support for half-duplex operation using time division duplex (TDD). A single component carrier bandwidth of 100 MHz may be supported. NR resource blocks may span 12 sub-carriers with a sub-carrier bandwidth of 75 kHz over a 0.1 millisecond (ms) duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. Beamforming may be supported and beam direction may be dynamically configured. Multiple Input Multiple Output (MIMO) transmissions with precoding may also be supported. MIMO configurations in the DL may support up to eight transmit antennas with multi-layer DL transmissions up to eight streams and up to two streams per wireless device or vehicle control unit. Multi-layer transmissions with up to 2 streams per wireless device or vehicle control unit may be supported. Aggregation of multiple cells may be supported with up to eight serving cells. Alternatively, NR may support a different air interface, other than an OFDM-based air interface.

In general, any number of communications systems and any number of wireless networks may be deployed in a given geographic area. Each communications system and wireless network may support a particular radio access technology (RAT) and may operate on one or more frequencies. A RAT also may be referred to as a radio technology, an air interface, etc. A frequency also may be referred to as a carrier, a frequency channel, etc. Each frequency may support a single RAT in a given geographic area in order to avoid interference between communications systems of different RATs. In some cases, 4G/LTE and/or 5G/NR RAT networks may be deployed. For example, a 5G non-standalone (NSA) network may utilize both 4G/LTE RAT in the 4G/LTE RAN side of the 5G NSA network and 5G/NR RAT in the 5G/NR RAN side of the 5G NSA network. The 4G/LTE RAN and the 5G/NR RAN may both connect to one another and a 4G/LTE core network (e.g., an evolved packet core (EPC) network) in a 5G NSA network. Other example network configurations may include a 5G standalone (SA) network in which a 5G/NR RAN connects to a 5G core network.

Figure 1B:
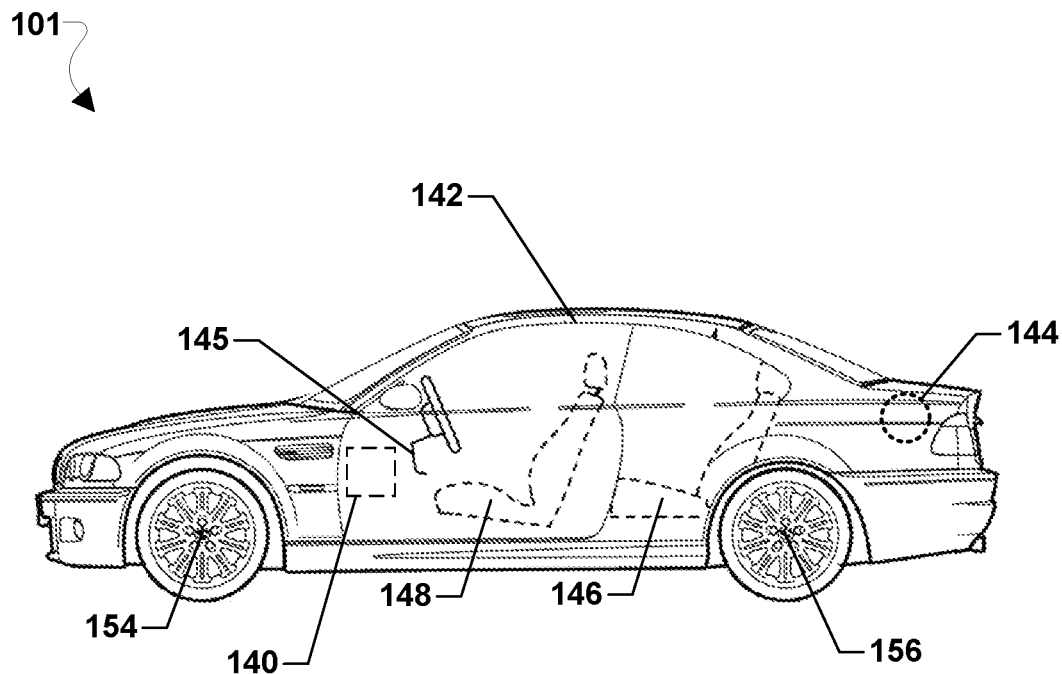
FIGS. 1B and 1C are component block diagrams illustrating a vehicle suitable for implementing various embodiments.
Figure 1C:
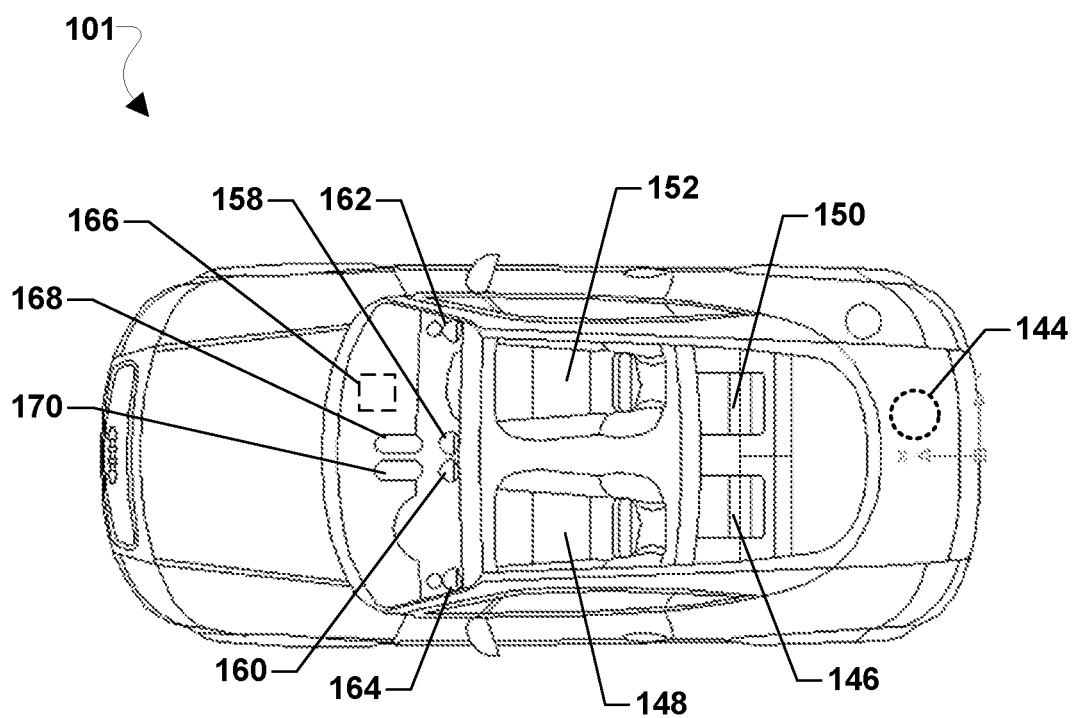

Various embodiments may be implemented within a variety of vehicles, an example vehicle 101 of which is illustrated in FIGS. 1A and 1B. With reference to FIGS. 1A and 1B, a vehicle 101 may include a vehicle control unit 140 and a plurality of sensors 144-170, including satellite geopositioning system receivers 142, occupancy sensors 144, 146, 148, 150, 152, tire pressure sensors 154, 156, cameras 158, 160, microphones 162, 164, impact sensors 166, radar 168, and lidar 170. The plurality of sensors 144-170, disposed in or on the vehicle, may be used for various purposes, such as autonomous and semi-autonomous navigation and control, crash avoidance, position determination, etc., as well as to provide sensor data regarding objects and people in or on the vehicle 101. The sensors 144-170 may include one or more of a wide variety of sensors capable of detecting a variety of information useful for navigation and collision avoidance. Each of the sensors 144-170 may be in wired or wireless communication with a vehicle control unit 140, as well as with each other. In particular, the sensors may include one or more cameras 158, 160 or other optical sensors or photo optic sensors. The sensors may further include other types of object detection and ranging sensors, such as radar 168, lidar 170, IR sensors, and ultrasonic sensors. The sensors may further include tire pressure sensors 154, 156, humidity sensors, temperature sensors, satellite geopositioning sensors 142, control input sensors 145, accelerometers, vibration sensors, gyroscopes, gravimeters, impact sensors 166, force meters, stress meters, strain sensors, fluid sensors, chemical sensors, gas content analyzers, pH sensors, radiation sensors, Geiger counters, neutron detectors, biological material sensors, microphones 162, 164, occupancy sensors 144, 146, 148, 150, 152, proximity sensors, and other sensors.

The processor of the vehicle control unit 140 may be configured with processor-executable instructions to perform navigation and collision avoidance operations using information received from various sensors, particularly the cameras 158, 160. In some embodiments, the vehicle control unit 140 may supplement the processing of camera images using distance and relative position (e.g., relative bearing angle) that may be obtained from radar 168 and/or lidar 170 sensors. The vehicle control unit 140 may further be configured to control steering, braking and speed of the vehicle 101 when operating in an autonomous or semi-autonomous mode using information regarding other vehicles determined using various embodiments.

Figure 1D:
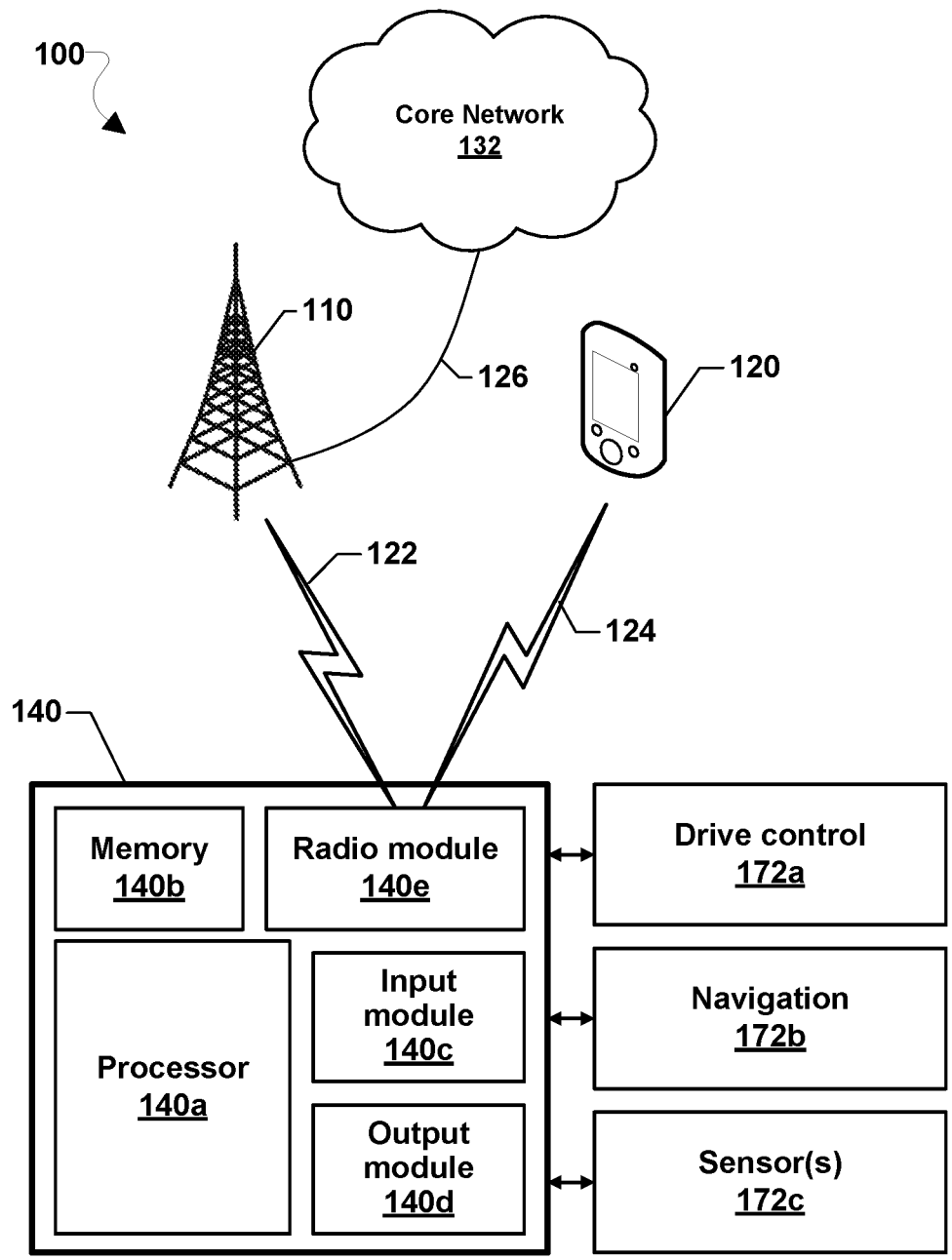
FIG. 1D is a component block diagram illustrating components of a vehicle suitable for implementing various embodiments.

FIG. 1D is a component block diagram illustrating a communication system 100 of components and support systems suitable for implementing various embodiments. With reference to FIGS. 1A-1D, the vehicle 101 may include a vehicle control unit 140, which may include various circuits and devices used to control the operation of the vehicle 101. In the example illustrated in FIG. 1D, the vehicle control unit 140 includes a processor 140a, memory 140b, an input module 140c, an output module 140d and a radio module 140e. The vehicle control unit 140 may be coupled to and configured to control drive control components 172a, navigation components 172b, and one or more sensors 172c of the vehicle 101. The processor 140a that may be configured with processor-executable instructions to control maneuvering, navigation, and/or other operations of the vehicle 101, including operations of various embodiments. The processor 140a may be coupled to the memory 140b.

The radio module 140e may be configured for wireless communication. The radio module 140e may exchange signals (e.g., command signals for controlling maneuvering, signals from navigation facilities, etc.) via the communication link 122 with a network transceiver (e.g., the base station 110), and may provide the signals to the processor 140a and/or the navigation unit 172b. In some embodiments, the radio module 140e may enable the vehicle 101 to communicate with a wireless communication device 120 through the wireless communication link 124. The wireless communication link 124 may be a bidirectional or unidirectional communication link, and may use one or more communication protocols, as described.

The input module 140c may receive sensor data from one or more vehicle sensors 172c as well as electronic signals from other components, including the drive control components 172a and the navigation components 172b. The output module 140d may communicate with or activate various components of the vehicle 101, including the drive control components 172a, the navigation components 172b, and the sensor(s) 172c.

The vehicle control unit 140 may be coupled to the drive control components 172a to control physical elements of the vehicle 101 related to maneuvering and navigation of the vehicle, such as the engine, motors, throttles, steering elements, flight control elements, braking or deceleration elements, and the like. The drive control components 172a may also include components that control other devices of the vehicle, including environmental controls (e.g., air conditioning and heating), external and/or interior lighting, interior and/or exterior informational displays (which may include a display screen or other devices to display information), safety devices (e.g., haptic devices, audible alarms, etc.), and other similar devices.

The vehicle control unit 140 may be coupled to the navigation components 172b, and may receive data from the navigation components 172b and be configured to use such data to determine the present position and orientation of the vehicle 101, as well as an appropriate course toward a destination. The navigation components 172b may include or be coupled to a global navigation satellite system (GNSS) receiver system (e.g., one or more Global Positioning System (GPS) receivers) enabling the vehicle 101 to determine its current position using GNSS signals. Alternatively, or in addition, the navigation components 172b may include radio navigation receivers for receiving navigation beacons or other signals from radio nodes, such as Wi-Fi access points, cellular network sites, radio station, remote computing devices, other vehicles, etc. Through control of the drive control elements 172a, the processor 140a may control the vehicle 101 to navigate and maneuver. The processor 140a and/or the navigation components 172b may be configured to communicate with a network element such as a server in a communication network (e.g., the core network 132) via the wireless communication link 122 to receive commands to control maneuvering, receive data useful in navigation, provide real-time position reports, and assess other data.

The vehicle control unit 140 may be coupled to one or more sensors 172c. The sensor(s) 172c may include the sensors 144-170 as described, and may the configured to provide a variety of data to the processor 140a.

While the vehicle control unit 140 is described as including separate components, in some embodiments some or all of the components (e.g., the processor 140a, the memory 140b, the input module 140c, the output module 140d, and the radio module 140e) may be integrated in a single device or module, such as a system-on-chip (SOC) processing device. Such an SOC processing device may be configured for use in vehicles and be configured, such as with processor-executable instructions executing in the processor 140a, to perform operations of navigation and collision avoidance using dynamic map data when installed in a vehicle.

Figure 2A:
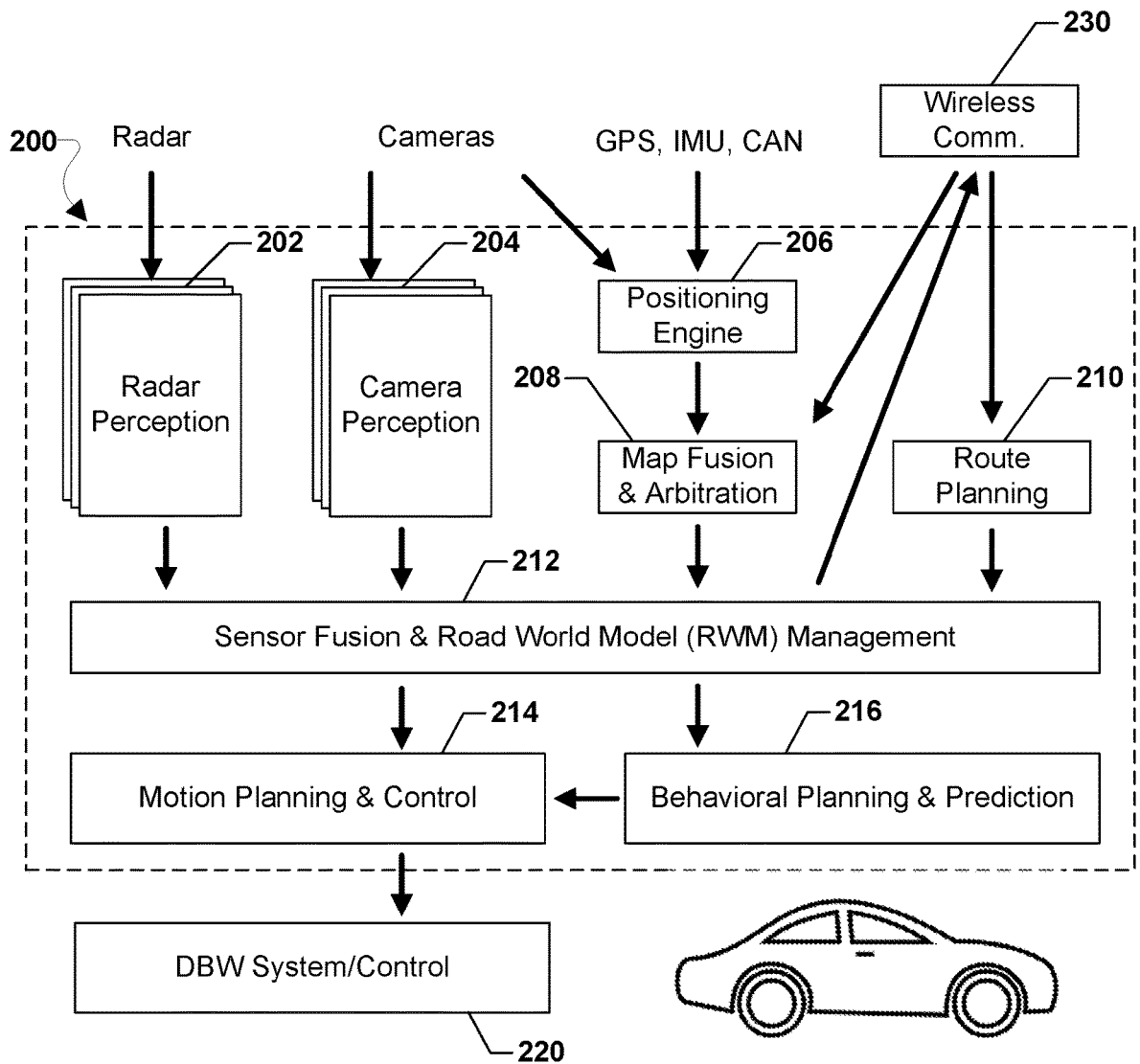
FIG. 2A is a component block diagram illustrating components of an example vehicle management system according to various embodiments.

FIG. 2A is a component block diagram illustrating components of an example vehicle management system 200. The vehicle management system 200 may include various subsystems, communication elements, computational elements, computing devices or units which may be utilized within a vehicle 101. With reference to FIGS. 1A-2A, the various computational elements, computing devices or units within vehicle management system 200 may be implemented within a system of interconnected computing devices (i.e., subsystems), that communicate data and commands to each other (e.g., indicated by the arrows in FIG. 2A). In some implementations, the various computational elements, computing devices or units within vehicle management system 200 may be implemented within a single computing device, such as separate threads, processes, algorithms or computational elements. Therefore, each subsystem/computational element illustrated in FIG. 2A is also generally referred to herein as "layer" within a computational "stack" that constitutes the vehicle management system 200. However, the use of the terms layer and stack in describing various embodiments are not intended to imply or require that the corresponding functionality is implemented within a single autonomous (or semi-autonomous) vehicle management system computing device, although that is a potential implementation embodiment. Rather the use of the term "layer" is intended to encompass subsystems with independent processors, computational elements (e.g., threads, algorithms, subroutines, etc.) running in one or more computing devices, and combinations of subsystems and computational elements.

The vehicle management system stack may include a radar perception layer 202, a camera perception layer 204, a positioning engine layer 206, a map fusion and arbitration layer 208, a route planning layer 210, sensor fusion and road world model (RWM) management layer 212, motion planning and control layer 214, and behavioral planning and prediction layer 216. The layers 202-216 are merely examples of some layers in one example configuration of the vehicle management system stack 200. In other configurations, other layers may be included, such as additional layers for other perception sensors (e.g., Light Detection and Ranging (LIDAR) perception layer, etc.), additional layers for planning and/or control, additional layers for modeling, etc., and/or certain of the layers 202-216 may be excluded from the vehicle management system stack 200. Each of the layers 202-216 may exchange data, computational results and commands as illustrated by the arrows in FIG. 2A. Further, the vehicle management system stack 200 may receive and process data from sensors (e.g., radar, lidar, cameras, inertial measurement units (IMU) etc.), navigation systems (e.g., GPS receivers, IMUs, etc.), vehicle networks (e.g., Controller Area Network (CAN) bus), and databases in memory (e.g., digital map data). The vehicle management system stack 200 may output vehicle control commands or signals to the drive by wire (DBW) system/vehicle control unit 220, which is a system, subsystem or computing device that interfaces directly with vehicle steering, throttle and brake controls. The configuration of the vehicle management system stack 200 and DBW system/vehicle control unit 220 illustrated in FIG. 2A is merely an example configuration and other configurations of a vehicle management system and other vehicle components may be used. As an example, the configuration of the vehicle management system stack 200 and DBW system/vehicle control unit 220 illustrated in FIG. 2A may be used in a vehicle configured for autonomous or semi-autonomous operation while a different configuration may be used in a non-autonomous vehicle.

The radar perception layer 202 may receive data from one or more detection and ranging sensors, such as radar (e.g., 132) and/or lidar (e.g., 138), and process the data to recognize and determine locations of other vehicles and objects within a vicinity of the vehicle 100. The radar perception layer 202 may include use of neural network processing and artificial intelligence methods to recognize objects and vehicles, and pass such information on to the sensor fusion and RWM management layer 212.

The camera perception layer 204 may receive data from one or more cameras, such as cameras (e.g., 122, 136), and process the data to recognize and determine locations of other vehicles and objects within a vicinity of the vehicle 100. The camera perception layer 204 may include use of neural network processing and artificial intelligence methods to recognize objects and vehicles, and pass such information on to the sensor fusion and RWM management layer 212.

The positioning engine layer 206 may receive data from various sensors and process the data to determine a position of the vehicle 100. The various sensors may include, but is not limited to, GPS sensor, an IMU, and/or other sensors connected via a CAN bus. The positioning engine layer 206 may also utilize inputs from one or more cameras, such as cameras (e.g., 122, 136) and/or any other available sensor, such as radars, LIDARs, etc.

The vehicle management system 200 may include or be coupled to a vehicle wireless communication subsystem 230. The wireless communication subsystem 230 may include components such as a wireless transceiver, a modem, a processor, memory, and other hardware, software, and/or circuitry to enable wireless communications. The wireless communication subsystem 230 may be configured to communicate with other vehicle computing devices and highway communication systems, such as via vehicle-to-vehicle (V2V) and/or vehicle-to-everything (V2X) communication links and/or to remote information sources, such as cloud-based resources, via cellular wireless communication systems, such as 5G networks. In various embodiments, the wireless communication subsystem 230 may communicate with Edge computing devices via wireless communication links.

The map fusion and arbitration layer 208 may access dynamic map data (e.g., received from an Edge computing device) and receive output received from the positioning engine layer 206 and process the data to further determine the position of the vehicle 101 within the map, such as location within a lane of traffic, position within a street map, etc. In some embodiments, the dynamic map data may include information related to a high-definition (HD) map or other suitable information. Map data may be stored in a memory (e.g., memory 166). For example, the map fusion and arbitration layer 208 may convert latitude and longitude information from GPS into locations within a surface map of roads contained in the map data. GPS position fixes include errors, so the map fusion and arbitration layer 208 may function to determine a best guess location of the vehicle within a roadway based upon an arbitration between the GPS coordinates and the map data. For example, while GPS coordinates may place the vehicle near the middle of a two-lane road in the map data, the map fusion and arbitration layer 208 may determine from the direction of travel that the vehicle is most likely aligned with the travel lane consistent with the direction of travel. The map fusion and arbitration layer 208 may pass map-based location information to the sensor fusion and RWM management layer 212.

The route planning layer 210 may utilize map data, as well as inputs from an operator or dispatcher to plan a route to be followed by the vehicle 101 to a particular destination. The route planning layer 210 may pass map-based location information to the sensor fusion and RWM management layer 212. However, the use of a prior map by other layers, such as the sensor fusion and RWM management layer 212, etc., is not required. For example, other stacks may operate and/or control the vehicle based on perceptual data alone without a provided map, constructing lanes, boundaries, and the notion of a local map as perceptual data is received.

The sensor fusion and RWM management layer 212 may receive data and outputs produced by the radar perception layer 202, camera perception layer 204, map fusion and arbitration layer 208, and route planning layer 210, and use some or all of such inputs to estimate or refine the location and state of the vehicle 101 in relation to the road, other vehicles on the road, and other objects within a vicinity of the vehicle 100. For example, the sensor fusion and RWM management layer 212 may combine imagery data from the camera perception layer 204 with arbitrated map location information from the map fusion and arbitration layer 208 to refine the determined position of the vehicle within a lane of traffic. As another example, the sensor fusion and RWM management layer 212 may combine object recognition and imagery data from the camera perception layer 204 with object detection and ranging data from the radar perception layer 202 to determine and refine the relative position of other vehicles and objects in the vicinity of the vehicle. As another example, the sensor fusion and RWM management layer 212 may receive information from vehicle-to-vehicle (V2V) communications (such as via the CAN bus) regarding other vehicle positions and directions of travel, and combine that information with information from the radar perception layer 202 and the camera perception layer 204 to refine the locations and motions of other vehicles. The sensor fusion and RWM management layer 212 may output refined location and state information of the vehicle 100, as well as refined location and state information of other vehicles and objects in the vicinity of the vehicle, to the motion planning and control layer 214 and/or the behavior planning and prediction layer 216.

As a further example, the sensor fusion and RWM management layer 212 may use dynamic traffic control instructions directing the vehicle 101 to change speed, lane, direction of travel, or other navigational element(s), and combine that information with other received information to determine refined location and state information. The sensor fusion and RWM management layer 212 may output the refined location and state information of the vehicle 100, as well as refined location and state information of other vehicles and objects in the vicinity of the vehicle 100, to the motion planning and control layer 214, the behavior planning and prediction layer 216 and/or devices remote from the vehicle 100, such as a data server, other vehicles, etc., via wireless communications, such as through C-V2X connections, other wireless connections, etc.

As a still further example, the sensor fusion and RWM management layer 212 may monitor perception data from various sensors, such as perception data from a radar perception layer 202, camera perception layer 204, other perception layer, etc., and/or data from one or more sensors themselves to analyze conditions in the vehicle sensor data. The sensor fusion and RWM management layer 212 may be configured to detect conditions in the sensor data, such as sensor measurements being at, above, or below a threshold, certain types of sensor measurements occurring, etc., and may output the sensor data as part of the refined location and state information of the vehicle 101 provided to the behavior planning and prediction layer 216 and/or devices remote from the vehicle 100, such as a data server, other vehicles, etc., via wireless communications, such as through C-V2X connections, other wireless connections, etc.

The refined location and state information may include vehicle descriptors associated with the vehicle and the vehicle owner and/or operator, such as: vehicle specifications (e.g., size, weight, make/model, color, on-board sensor types, on-board computing capabilities, etc.); vehicle position, speed, acceleration, direction of travel, attitude, orientation, destination, fuel/power level(s), occupancy information, and other state information; vehicle emergency status (e.g., is the vehicle an emergency vehicle or private individual in an emergency); vehicle restrictions (e.g., heavy/wide load, turning restrictions, high occupancy vehicle (HOV) authorization, etc.); capabilities (e.g., all-wheel drive, four-wheel drive, snow tires, chains, connection types supported, on board sensor operating statuses, on board sensor resolution levels, etc.) of the vehicle; equipment problems (e.g., low tire pressure, weak breaks, sensor outages, etc.); owner/operator travel preferences (e.g., preferred lane, roads, routes, and/or destinations, preference to avoid tolls or highways, preference for the fastest route, etc.); permissions to provide sensor data to a data agency server (e.g., 184); and/or owner/operator identification information.

The behavioral planning and prediction layer 216 of the autonomous vehicle system stack 200 may use the refined location and state information of the vehicle 101 and location and state information of other vehicles and objects output from the sensor fusion and RWM management layer 212 to predict future behaviors of other vehicles and/or objects. For example, the behavioral planning and prediction layer 216 may use such information to predict future relative positions of other vehicles in the vicinity of the vehicle based on own vehicle position and velocity and other vehicle positions and velocity. Such predictions may take into account information from the map data and route planning to anticipate changes in relative vehicle positions as host and other vehicles follow the roadway. The behavioral planning and prediction layer 216 may output other vehicle and object behavior and location predictions to the motion planning and control layer 214. Additionally, the behavior planning and prediction layer 216 may use object behavior in combination with location predictions to plan and generate control signals for controlling the motion of the vehicle 100. For example, based on route planning information, refined location in the roadway information, and relative locations and motions of other vehicles, the behavior planning and prediction layer 216 may determine that the vehicle 101 needs to change lanes and accelerate, such as to maintain or achieve minimum spacing from other vehicles, and/or prepare for a turn or exit. As a result, the behavior planning and prediction layer 216 may calculate or otherwise determine a steering angle for the wheels and a change to the throttle setting to be commanded to the motion planning and control layer 214 and DBW system/vehicle control unit 220 along with such various parameters necessary to effectuate such a lane change and acceleration. One such parameter may be a computed steering wheel command angle.

The motion planning and control layer 214 may receive data and information outputs from the sensor fusion and RWM management layer 212 and other vehicle and object behavior as well as location predictions from the behavior planning and prediction layer 216, and use this information to plan and generate control signals for controlling the motion of the vehicle 101 and to verify that such control signals meet safety requirements for the vehicle 100. For example, based on route planning information, refined location in the roadway information, and relative locations and motions of other vehicles, the motion planning and control layer 214 may verify and pass various control commands or instructions to the DBW system/vehicle control unit 220.

The DBW system/vehicle control unit 220 may receive the commands or instructions from the motion planning and control layer 214 and translate such information into mechanical control signals for controlling wheel angle, brake and throttle of the vehicle 100. For example, DBW system/vehicle control unit 220 may respond to the computed steering wheel command angle by sending corresponding control signals to the steering wheel controller.

In various embodiments, the wireless communication subsystem 230 may communicate with Edge computing devices via wireless communication links to transmit sensor data, position data, vehicle data and data gathered about the environment around the vehicle by onboard sensors. Such information may be used by Edge computing devices to update map data for relay to vehicles within the local area of each Edge computing device.

In various embodiments, the vehicle management system stack 200 may include functionality that performs safety checks or oversight of various commands, planning or other decisions of various layers that could impact vehicle and occupant safety. Such safety check or oversight functionality may be implemented within a dedicated layer or distributed among various layers and included as part of the functionality. In some embodiments, a variety of safety parameters may be stored in memory and the safety checks or oversight functionality may compare a determined value (e.g., relative spacing to a nearby vehicle, distance from the roadway centerline, etc.) to corresponding safety parameter(s), and issue a warning or command if the safety parameter is or will be violated. For example, a safety or oversight function in the behavior planning and prediction layer 216 (or in a separate layer) may determine the current or future separate distance between another vehicle (as defined by the sensor fusion and RWM management layer 212) and the vehicle (e.g., based on the world model refined by the sensor fusion and RWM management layer 212), compare that separation distance to a safe separation distance parameter stored in memory, and issue instructions to the motion planning and control layer 214 to speed up, slow down or turn if the current or predicted separation distance violates the safe separation distance parameter. As another example, safety or oversight functionality in the motion planning and control layer 214 (or a separate layer) may compare a determined or commanded steering wheel command angle to a safe wheel angle limit or parameter, and issue an override command and/or alarm in response to the commanded angle exceeding the safe wheel angle limit.

Some safety parameters stored in memory may be static (i.e., unchanging over time), such as maximum vehicle speed. Other safety parameters stored in memory may be dynamic in that the parameters are determined or updated continuously or periodically based on vehicle state information and/or environmental conditions. Non-limiting examples of safety parameters include maximum safe speed, maximum brake pressure, maximum acceleration, and the safe wheel angle limit, all of which may be a function of roadway and weather conditions.

Figure 2B:
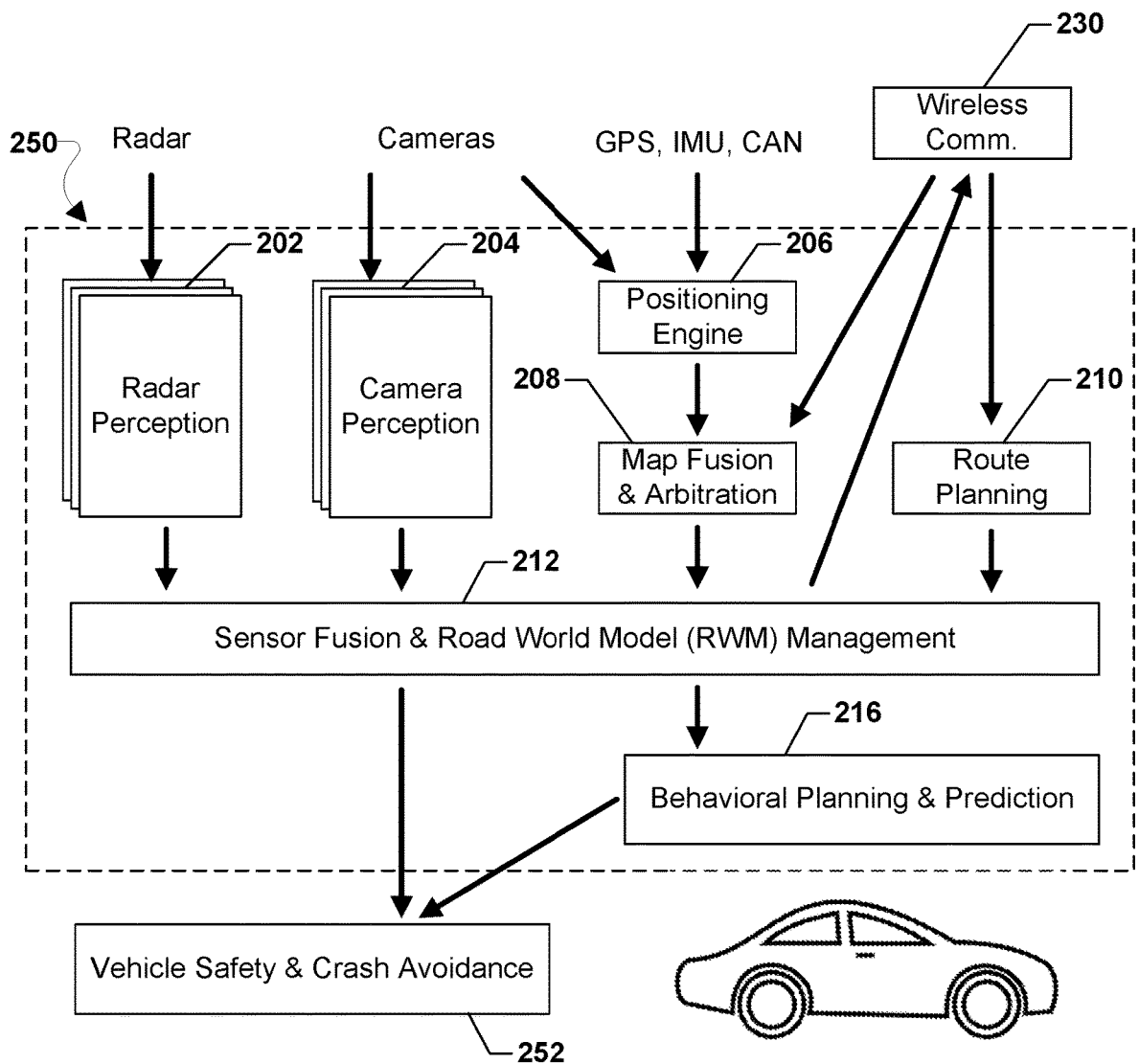
FIG. 2B is a component block diagram illustrating components of another example vehicle management system according to various embodiments

FIG. 2B illustrates an example of subsystems, computational elements, computing devices or units within a vehicle management system 250, which may be utilized within a vehicle 100. With reference to FIGS. 1A-2B, in some embodiments, the layers 202, 204, 206, 208, 210, 212, and 216 of the vehicle management system stack 200 may be similar to those described with reference to FIG. 2A and the vehicle management system stack 250 may operate similar to the vehicle management system stack 200, except that the vehicle management system stack 250 may pass various data or instructions to a vehicle safety and crash avoidance system 252 rather than the DBW system/vehicle control unit 220. For example, the configuration of the vehicle management system stack 250 and the vehicle safety and crash avoidance system 252 illustrated in FIG. 2B may be used in a non-autonomous vehicle.

In various embodiments, the behavioral planning and prediction layer 216 and/or sensor fusion and RWM management layer 212 may output data to the vehicle safety and crash avoidance system 252. For example, the sensor fusion and RWM management layer 212 may output sensor data as part of refined location and state information of the vehicle 101 provided to the vehicle safety and crash avoidance system 252. The vehicle safety and crash avoidance system 252 may use the refined location and state information of the vehicle 101 to make safety determinations relative to the vehicle 101 and/or occupants of the vehicle 100. As another example, the behavioral planning and prediction layer 216 may output behavior models and/or predictions related to the motion of other vehicles to the vehicle safety and crash avoidance system 252. The vehicle safety and crash avoidance system 252 may use the behavior models and/or predictions related to the motion of other vehicles to make safety determinations relative to the vehicle 101 and/or occupants of the vehicle 100.

In various embodiments, the vehicle safety and crash avoidance system 252 may include functionality that performs safety checks or oversight of various commands, planning, or other decisions of various layers, as well as human driver actions, that could impact vehicle and occupant safety. In some embodiments, a variety of safety parameters may be stored in memory and the vehicle safety and crash avoidance system 252 may compare a determined value (e.g., relative spacing to a nearby vehicle, distance from the roadway centerline, etc.) to corresponding safety parameter(s), and issue a warning or command if the safety parameter is or will be violated. For example, a vehicle safety and crash avoidance system 252 may determine the current or future separate distance between another vehicle (as defined by the sensor fusion and RWM management layer 212) and the vehicle (e.g., based on the world model refined by the sensor fusion and RWM management layer 212), compare that separation distance to a safe separation distance parameter stored in memory, and issue instructions to a driver to speed up, slow down or turn if the current or predicted separation distance violates the safe separation distance parameter. As another example, a vehicle safety and crash avoidance system 252 may compare a human driver's change in steering wheel angle to a safe wheel angle limit or parameter, and issue an override command and/or alarm in response to the steering wheel angle exceeding the safe wheel angle limit.

Figure 3:
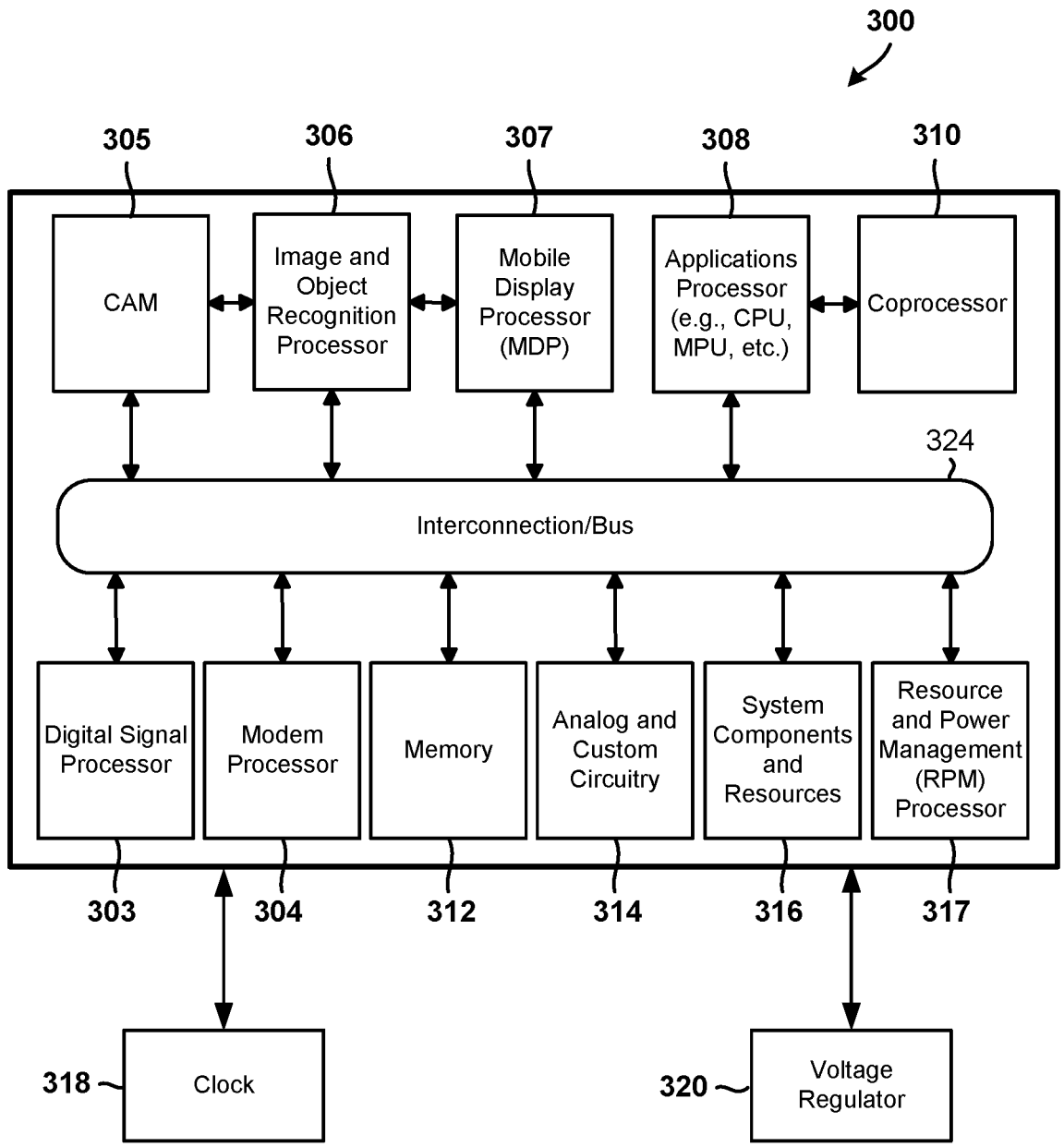
FIG. 3 is a block diagram illustrating components of a system on chip for use in a vehicle in accordance with various embodiments.

FIG. 3 illustrates an example system-on-chip (SOC) architecture of a processing device SOC 300 suitable for implementing various embodiments in vehicles. With reference to FIGS. 1A-3, the processing device SOC 300 may include a number of heterogeneous processors, such as a digital signal processor (DSP) 303, a modem processor 304, an image and object recognition processor 306, a mobile display processor 307, an applications processor 308, and a resource and power management (RPM) processor 317. The processing device SOC 300 may also include one or more coprocessors 310 (e.g., vector co-processor) connected to one or more of the heterogeneous processors 303, 304, 306, 307, 308, 317. Each of the processors may include one or more cores, and an independent/internal clock.

Each processor/core may perform operations independent of the other processors/cores. For example, the processing device SOC 300 may include a processor that executes a first type of operating system (e.g., FreeBSD, LINUX, OS X, etc.) and a processor that executes a second type of operating system (e.g., Microsoft Windows). In some embodiments, the applications processor 308 may be the SOC's 300 main processor, central processing unit (CPU), microprocessor unit (MPU), arithmetic logic unit (ALU), etc. The graphics processor 306 may be graphics processing unit (GPU).

The processing device SOC 300 may include analog circuitry and custom circuitry 314 for managing sensor data, analog-to-digital conversions, wireless data transmissions, and for performing other specialized operations, such as processing encoded audio and video signals for rendering in a web browser. The processing device SOC 300 may further include system components and resources 316, such as voltage regulators, oscillators, phase-locked loops, peripheral bridges, data controllers, memory controllers, system controllers, access ports, timers, and other similar components used to support the processors and software clients (e.g., a web browser) running on a computing device.

The processing device SOC 300 also include specialized circuitry for camera actuation and management (CAM) 305 that includes, provides, controls and/or manages the operations of one or more cameras 158, 160 (e.g., a primary camera, webcam, 3D camera, etc.), the video display data from camera firmware, image processing, video preprocessing, video front-end (VFE), in-line JPEG, high definition video codec, etc. The CAM 305 may be an independent processing unit and/or include an independent or internal clock.

In some embodiments, the image and object recognition processor 306 may be configured with processor-executable instructions and/or specialized hardware configured to perform image processing and object recognition analyses involved in various embodiments. For example, the image and object recognition processor 306 may be configured to perform the operations of processing images received from cameras (e.g., 122, 136) via the CAM 305 to recognize and/or identify other vehicles, and otherwise perform functions of the camera perception layer 204 as described. In some embodiments, the processor 306 may be configured to process radar or lidar data and perform functions of the radar perception layer 202 as described.

The system components and resources 316, analog and custom circuitry 314, and/or CAM 305 may include circuitry to interface with peripheral devices, such as cameras 158, 160, radar 168, lidar 170, electronic displays, wireless communication devices, external memory chips, etc. The processors 303, 304, 306, 307, 308 may be interconnected to one or more memory elements 312, system components and resources 316, analog and custom circuitry 314, CAM 305, and RPM processor 317 via an interconnection/bus module 324, which may include an array of reconfigurable logic gates and/or implement a bus architecture (e.g., CoreConnect, AMBA, etc.). Communications may be provided by advanced interconnects, such as high-performance networks-on chip (NoCs).

The processing device SOC 300 may further include an input/output module (not illustrated) for communicating with resources external to the SOC, such as a clock 318 and a voltage regulator 320. Resources external to the SOC (e.g., clock 318, voltage regulator 320) may be shared by two or more of the internal SOC processors/cores (e.g., a DSP 303, a modem processor 304, a graphics processor 306, an applications processor 308, etc.).

In some embodiments, the processing device SOC 300 may be included in a vehicle control unit (e.g., 140) for use in a vehicle (e.g., 100). The vehicle control unit may include communication links for communication with a telephone network (e.g., 180), the Internet, and/or a network server (e.g., 184) as described.

The processing device SOC 300 may also include additional hardware and/or software components that are suitable for collecting sensor data from sensors, including motion sensors (e.g., accelerometers and gyroscopes of an IMU), user interface elements (e.g., input buttons, touch screen display, etc.), microphone arrays, sensors for monitoring physical conditions (e.g., location, direction, motion, orientation, vibration, pressure, etc.), cameras, compasses, GPS receivers, communications circuitry (e.g., Bluetooth®, WLAN, WiFi, etc.), and other well-known components of modern electronic devices.

Figure 4A:
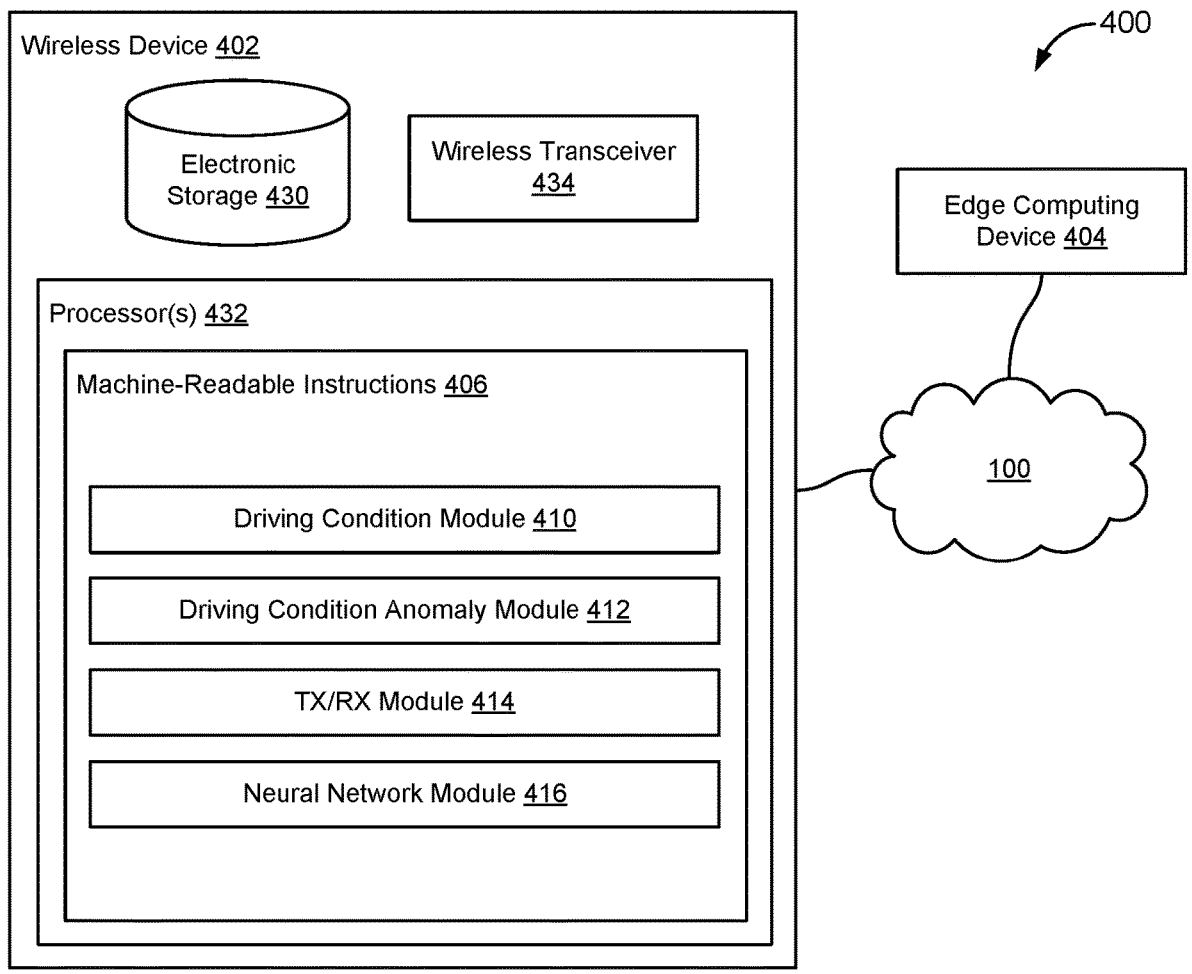
FIGS. 4A and 4B are component block diagrams illustrating a system for managing a driving condition anomaly in accordance with various embodiments.
Figure 4B:
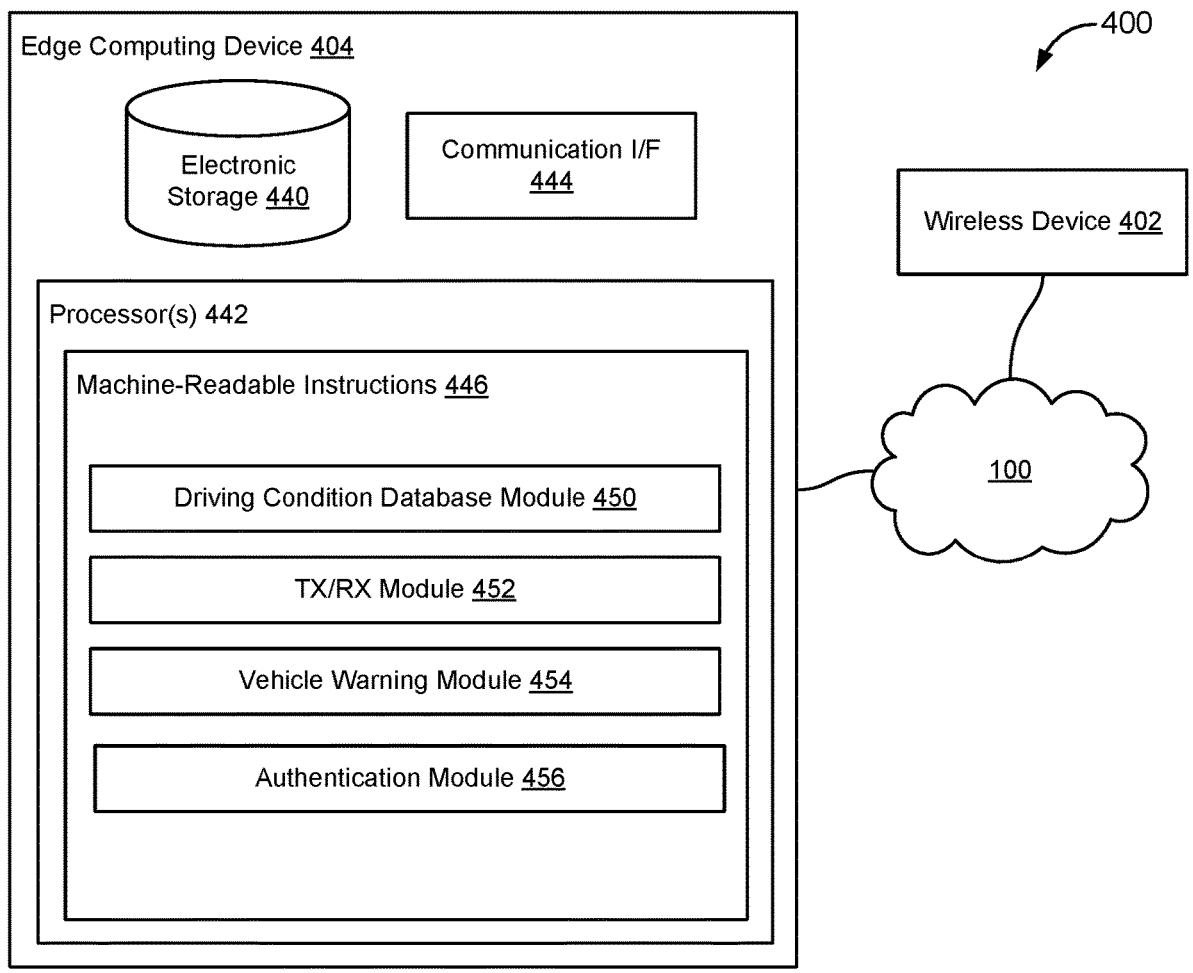

FIGS. 4A and 4B are component block diagrams illustrating a system 400 configured for managing a driving condition anomaly in accordance with various embodiments. In some embodiments, the system 400 may include one or more vehicle control units 402 (e.g., the vehicle 120f) and/or one or more Edge computing device 404 (e.g., 134a). With reference to FIGS. 1A-4B, the vehicle control unit(s) 402 may include a processor (e.g., 140a), a processing device (e.g., 300), and/or a vehicle control unit (e.g., 104) (variously referred to as a "processor"). The Edge computing device 402 may include an analogous processor, processing device, and/or a vehicle control unit (e.g., 104) (variously referred to as a "processor"), and may be part of an Edge network 134. The vehicle control unit(s) 402 and the Edge computing device(s) 404 may communication over a communication network 100, aspects of which are described above.

The vehicle control unit 402 may be configured by machine-executable instructions 406. Machine-executable instructions 406 may include one or more instruction modules. The instruction modules may include computer program modules. The instruction modules may include one or more of a driving condition module 410, a driving condition anomaly module 412, a transmit/receive (TX/RX) module 414, a neural network module 416, and/or other instruction modules.

The driving condition module 410 may be configured to receive a first driving condition based on data from a first vehicle sensor and a second driving condition based on data from another data source.

The driving condition anomaly module 412 may be configured to determine a driving condition anomaly based on the first driving condition and the second driving condition. The driving condition anomaly module 412 may be configured to resolve the driving condition anomaly based on the requested information from the driving condition database.

The transmit/receive (TX/RX) module 414 may be configured to manage communications to and from the vehicle control unit 402. The TX/RX module 414 may be configured to send a request for information to a driving condition database remote from the vehicle. The TX/RX module 414 may be configured to the request information from the driving condition database. The TX/RX module 414 may be configured to send the first driving condition to the driving condition database. The TX/RX module 414 may be configured to send the driving condition anomaly to the driving condition database.

The neural network module 416 may be configured to apply the data from a first vehicle sensor to a first neural network. The neural network module 416 may be configured to receive as output from the first neural network the first driving condition. The neural network module 416 may be configured to apply information from the other data source to a second neural network. The neural network module 416 may be configured to receive as output from the second neural network the second driving condition.

The Edge computing device 404 may be configured by machine-executable instructions 446. Machine-executable instructions 446 may include one or more instruction modules. The instruction modules may include computer program modules. The instruction modules may include one or more of a driving condition database module 450, a transmit/receive (TX/RX) module 452, a vehicle warning module 454, an authentication module 456, and/or other instruction modules.

The driving condition database module 450 may be configured to incorporate the information about the driving condition anomaly into a driving condition database.

The transmit/receive (TX/RX) module 452 may be configured to receive information about a driving condition anomaly from a first vehicle.

The vehicle warning module 454 may be configured to determine whether the driving condition anomaly exceeds a warning threshold. The vehicle warning module 454 may be configured to determine whether the second vehicle is within a warning radius of the driving condition anomaly.

The authentication module 456 may be configured to perform an authentication operation to determine whether the first vehicle is authorized to provide the information about the driving condition anomaly.

The vehicle control unit 402 and the Edge computing device 404 may include one or more processors 432, 442 configured to execute computer program modules. The vehicle control unit 402 and the Edge computing device 404 may include an electronic storage 430, 440, one or more processors 432, 442, and/or other components. The vehicle control unit 402 and the Edge computing device 404 wired and/or wireless communication components, such as a wireless transceiver 434 or a communication interface 444. The illustration of the vehicle control unit 402 and the Edge computing device 404 in FIGS. 4A and 4B are not intended to be limiting. The Edge computing device 402 may include a plurality of hardware, software, and/or firmware components operating together to provide the functionality attributed herein to Edge computing device 402. For example, the Edge computing device 402 may be implemented by a cloud of computing platforms operating together as Edge computing device 402.

The electronic storage 430, 440 may comprise non-transitory storage media that electronically stores information. The electronic storage media of the electronic storage 430, 440 may include one or both of system storage that is provided integrally (i.e., substantially non-removable) with the vehicle control unit 402 and the Edge computing device 404 and/or removable storage that is removably connectable to the vehicle control unit 402 and the Edge computing device 404 via, for example, a port (e.g., a universal serial bus (USB) port, a firewire port, etc.) or a drive (e.g., a disk drive, etc.). The electronic storage 430, 440 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 430, 440 may include one or more virtual storage resources (e.g., cloud storage, a virtual private network, and/or other virtual storage resources). The electronic storage 430, 440 may store software algorithms, information determined by processor(s) 432, 442, information received from the vehicle control unit 402, information received from the Edge computing device 404, and/or other information that enables the vehicle control unit 402 and the Edge computing device 404 to function as described herein.

Processor(s) 432, 442 may be configured to provide information processing capabilities in the vehicle control unit 402 and the Edge computing device 404. As such, processor(s) 432, 442 may include one or more of a digital processor, an analog processor, a digital circuit designed to process information, an analog circuit designed to process information, a state machine, and/or other mechanisms for electronically processing information. Although processor(s) 432, 442 are shown as a single entity, this is for illustrative purposes only. In some implementations, processor(s) 432, 442 may include a plurality of processing units. These processing units may be physically located within the same device, or processor(s) 432, 442 may represent processing functionality of a plurality of devices operating in coordination. Processor(s) 432, 442 may be configured to execute modules 410-416 and 450-456 and/or other modules. Processor(s) 434 may be configured to execute modules 410-416 and 450-456 and/or other modules by software; hardware; firmware; some combination of software, hardware, and/or firmware; and/or other mechanisms for configuring processing capabilities on the processor(s) 432, 442. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 410-416 and 450-456 are illustrated as being implemented within a single processing unit, in implementations in which the processor(s) 432, 442 include multiple processing units, one or more of the modules 410-416 and 450-456, may be implemented remotely from the other modules. The description of the functionality provided by the different modules 408-418 described below is for illustrative purposes, and is not intended to be limiting, as any of the modules 410-416 and 450-456 may provide more or less functionality than is described. For example, one or more of modules 410-416 and 450-456 may be eliminated, and some or all of its functionality may be provided by other ones of the modules 410-416 and 450-456. As another example, processor(s) 433, 442 may be configured to execute one or more additional modules that may perform some or all of the functionality attributed below to one of the modules 410-416 and 450-456.

Figure 5:
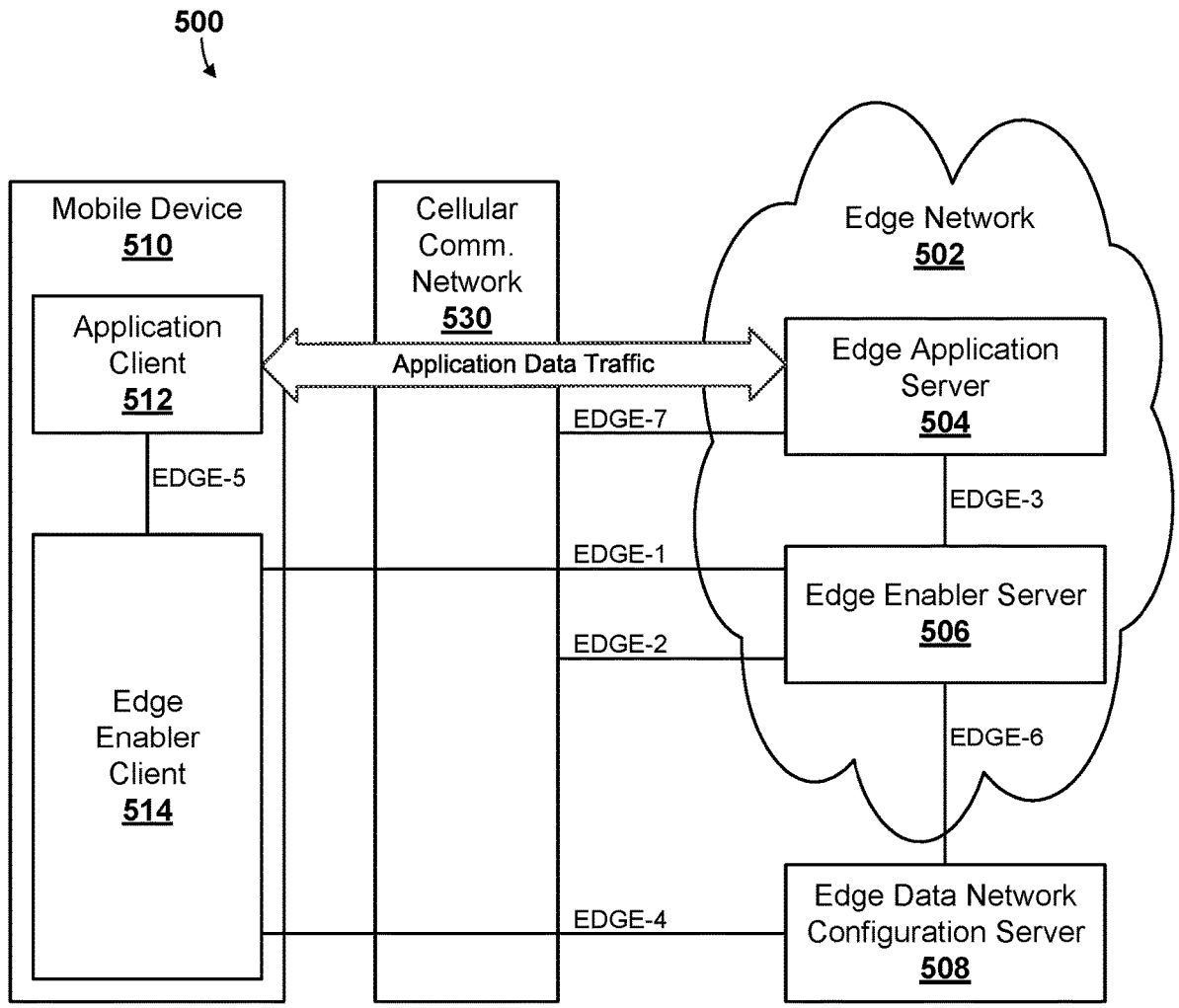
FIG. 5 is a system block diagram illustrating an example Edge computing system suitable for use with various embodiments.

FIG. 5 is a system block diagram illustrating an example Edge computing system 500 suitable for use with various embodiments. In some embodiments, Edge computing system 500 may include an Edge network 502 (e.g., the Edge network 134) and a vehicle control unit 510 configured to communicate via a cellular communication network 530. The Edge network 502 may include an Edge application server 502 and an Edge enabler server 506, in communication with an Edge data network configuration server 508. The vehicle control unit 510 may include an application client 512 in communication with an Edge enabler client 512. Each of the elements of the Edge computing system 500 may communicate over an Edge interface (e.g., EDGE-1, EDGE-2, etc.).

The Edge application server 504 and the application client 512 each may be configured to process computing tasks, and may communicate application data traffic (i.e., data related to a computing task) via the cellular communication network 530. The Edge enabler server 506 may be configured to maintain and advertise (e.g., to devices such as the vehicle control unit 510) applications provided by the Edge application server 504. The Edge data network configuration server 508 may be configured to manage communication within and among one or more Edge data networks.

The Edge application server 504 may provide information about its applications and their capabilities to the Edge enabler server 506 via the EDGE-3 interface. The Edge enabler server 506 may provide information about the Edge network 502 to the Edge data network configuration server 508 via the EDGE-6 interface. The Edge application server 504 and the Edge enabler server 506 may communicate with the cellular communication network 530 via the EDGE-7 interface and the EDGE-2 interface, respectively.

In some embodiments, the Edge enabler client 514 may obtain information about the available Edge data networks from the Edge data network configuration server 508 via the EDGE-1 interface. In some embodiments, the Edge enabler client 514 may obtain information about Edge application server 504 such as available applications and their capabilities via the EDGE-4 interface. In some embodiments, the Edge enabler client 514, the Edge enabler server 506, and the Edge data network configuration server 508 may employ a discovery and provisioning procedure via their respective Edge interfaces.

The application client 512 may communicate with the Edge enabler client 514 via the EDGE-5 interface. In some embodiments, the Edge enabler client 514 may obtain information about available Edge data networks from the Edge data network configuration server 508 via the EDGE-4 interface, and may coordinate the use of the Edge application server 504 with the Edge enabler server 506 via the EDGE-1 interface.

Figure 6:
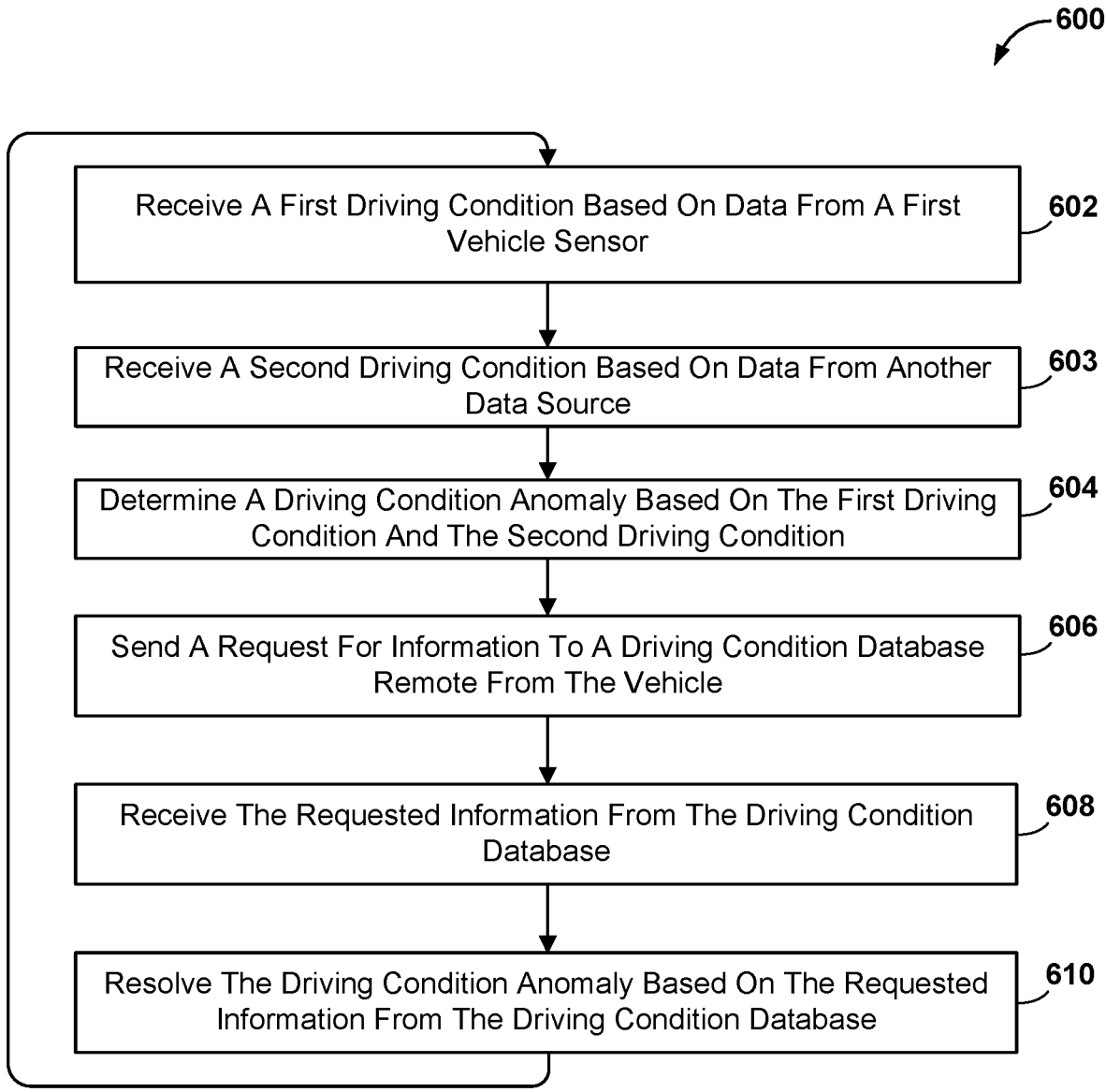
FIG. 6 is a process flow diagram illustrating operations performed by a processor of a vehicle control unit of a method for managing a driving condition anomaly in accordance with various embodiments.

FIG. 6 is a process flow diagram illustrating operations of a method 600 performed by a processor of a vehicle control unit for managing a driving condition anomaly in accordance with various embodiments. With reference to FIGS. 1-6, the operations of the method 600 may be performed by a processor of a vehicle control unit (e.g., 120a-120e, 170a, 170b, 200, 320).

In block 602, the processor may receive a first driving condition based on data from a first vehicle sensor.

In block 603, the processor may receive a second driving condition based on data from another data source (i.e., different from the first vehicle sensor). In various embodiments, the processor may receive the first driving condition and the second driving condition in any sequence, at different times, or at the same time.

Examples of the first driving condition and the second driving condition include traffic sign information, traffic light information, a speed limit, a road condition, a traffic condition, observed behavior of a second vehicle, observed behavior of a person outside the vehicle, information from a navigation system, information from an electronic map, an instruction received from an autonomous maneuvering system of the vehicle, and an instruction received from an intelligent traffic system (ITS). In some embodiments, the other data source may include a high-definition map. In some embodiments, the other data source may include a second vehicle sensor. Means for performing functions of the operations in block 602 may include a processor (e.g., 140*a*, 303, 304, 308, 310, 317, 402), a sensor (e.g., 144-170, 172*c*), and/or a wireless communication system (e.g., 230).

In block 604, the processor may determine a driving condition anomaly based on the first driving condition and the second driving condition. In some embodiments, the vehicle may determine the driving condition anomaly in response to determining that a difference between the first driving condition and the second driving condition exceeds a threshold. In some embodiments, the vehicle may determine the driving condition anomaly in response to determining that the first driving condition exceeds a condition threshold based on the second driving condition. In some embodiments, the vehicle may determine the driving condition anomaly in response to determining that the first driving condition contradicts an aspect of the second driving condition. Means for performing functions of the operations in block 604 may include the processor (e.g., 140*a*, 303, 304, 308, 310, 317, 402).

In block 606, the processor may send a request for information to a driving condition database remote from the vehicle. In some embodiments, the processor may send the request for information to an Edge computing device.

In some embodiments, the processor may send the request for information to the driving condition database with information that enables the driving condition database to determine information that is relevant to the vehicle. For example, the processor may send to the driving condition database information such as a location of the vehicle, a speed of the vehicle, a planned path of the vehicle, a radius from the vehicle, or other suitable information. The driving condition database may use such information to select information to send to the vehicle. For example, the driving condition database may select information based on the location of the vehicle, such as information about the area or locality around the vehicle. As another example, based on the speed of the vehicle, the driving condition database may select information that the vehicle may encounter within a time period (e.g., 30 seconds, 1 minute, etc.). As another example, based on the planned path of the vehicle, the driving condition database may select information that the vehicle will likely encounter on or near the planned path (e.g., within a threshold distance of the planned path). As another example, based on the radius from the vehicle, the driving condition database may select information within the radius from the vehicle. Other examples are also possible. Means for performing functions of the operations in block 606 may include the processor (e.g., 140*a*, 303, 304, 308, 310, 317, 402) and the wireless communication system (e.g., 230).

In block 608, the processor may receive the requested information from the driving condition database. Means for performing functions of the operations in block 608 may include the processor (e.g., 140*a*, 303, 304, 308, 310, 317, 402) and the wireless communication system (e.g., 230).

In block 610, the processor may resolve the driving condition anomaly based on the requested information from the driving condition database. In some embodiments, the vehicle may refrain from using the first driving condition for vehicle operations in response to determining that the anomaly is caused by an error in the first driving condition. For example, the vehicle may determine that the about the first driving condition is incorrect, and the vehicle may ignore or otherwise refrain from using the first driving condition vehicle operations, such as maneuvering decisions.

In some embodiments, in block 610 the processor may assign less weight to the first driving condition in response to determining that the driving condition anomaly is caused by an error in the first driving condition. In some embodiments, in block 610 the processor may reduce a weight or other value associated with the first driving condition so as to resolve the driving condition anomaly. In some embodiments, in block 610 the vehicle control unit may reduce a weight associated with the first driving condition (e.g., a speed limit) by a factor, an offset, a percentage, or another suitable reduction. In some embodiments, in block 610 the vehicle control unit may iteratively reduce a value of the first driving condition (e.g., substitute a first slower speed, then a second slower speed, etc.) until the reduced value of the first driving condition resolves the driving condition anomaly. In some embodiments, in block 610 the vehicle control unit may substitute the second driving condition for the first driving condition (i.e., use the second driving condition instead of the first driving condition). Means for performing functions of the operations in block 610 may include the processor (e.g., 140*a*, 303, 304, 308, 310, 317, 402).

The processor may repeat the operations of blocks 602-610 detect and resolve driving condition anomalies.

FIGS. 7A-7E are process flow diagrams illustrating operations 700*a*-700*e* that may be performed by a processor of a vehicle control unit as part of the method 600 for managing a driving condition anomaly in accordance with various embodiments. With reference to FIGS. 1-7E, the operations 700*a*-700*e* may be performed by a processor of a vehicle control unit (e.g., the vehicle control unit 120*a*-120*e*, 170*a*, 170*b*, 200, 320).

Figure 7A:
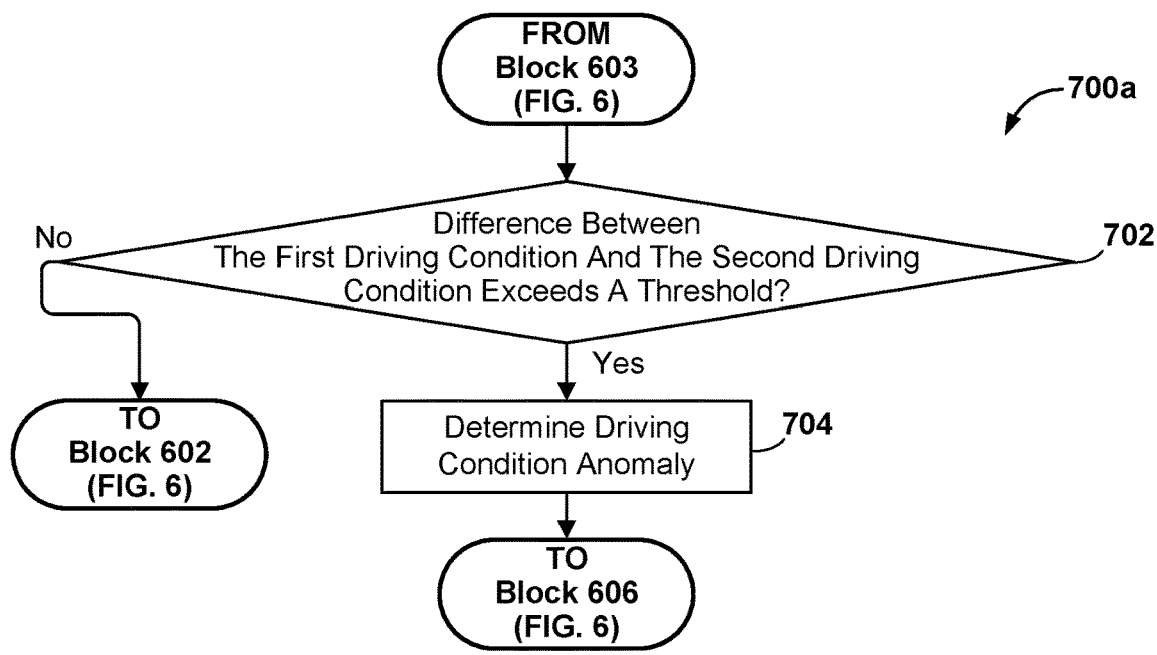
FIGS. 7A-7E are process flow diagrams illustrating operations that may be performed by a processor of a vehicle control unit as part of the method for managing a driving condition anomaly in accordance with various embodiments.

Referring to FIG. 7A, the operations 700*a* illustrate an example of operations that may be performed to determine a driving condition anomaly in a second driving condition resulting from or based on a first driving condition. Following the performance of block 603 (FIG. 6), the processor may determine whether a difference between the first driving condition and the second driving condition exceeds a threshold in determination block 702. Means for performing functions of the operations in block 702 may include the processor (e.g., 140*a*, 303, 304, 308, 310, 317, 402).

In response to determining that the difference between the first driving condition and the second driving condition does not exceed the threshold (i.e., determination block 702="No"), the processor may perform the operations of block 602 (FIG. 6).

In response to determining that the difference between the first driving condition and the second driving condition exceeds the threshold (i.e., determination block 702="Yes"), the processor may determine the driving condition anomaly in block 704.

The processor may then perform the operations of block 606 (FIG. 6) as described.

Figure 7B:
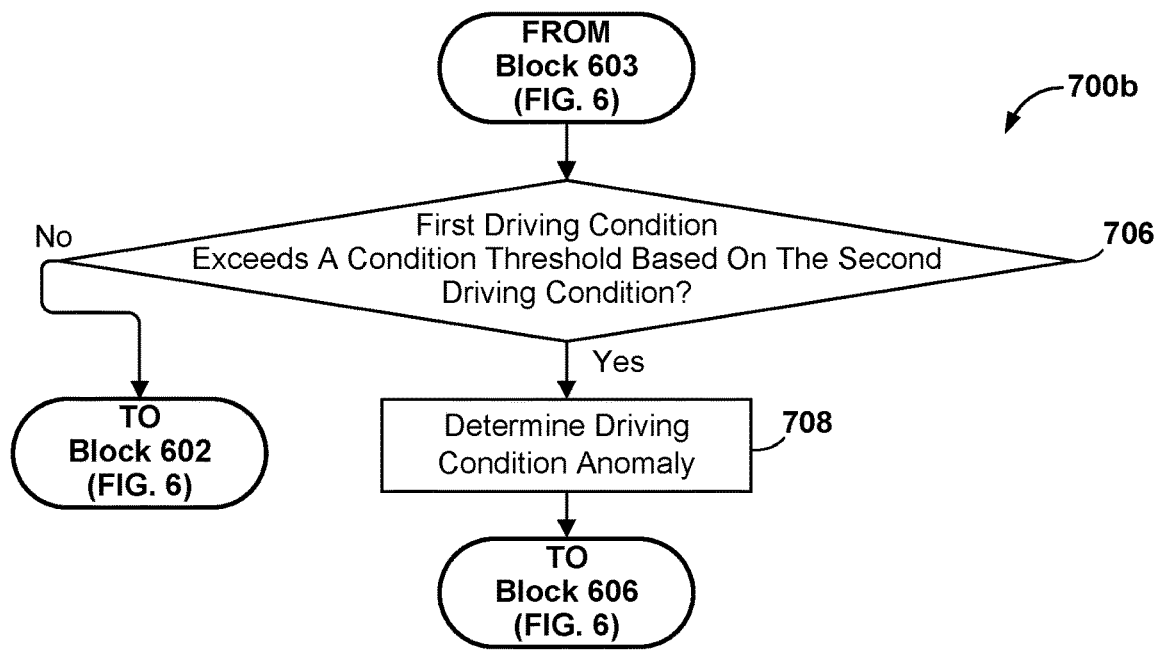

Referring to FIG. 7B, the operations 700*b* illustrate another example of operations that may be performed to determine a driving condition anomaly in a second driving condition resulting from or based on a first driving condition. Following the performance of block 603 (FIG. 6), the processor may determine whether the first driving condition exceeds a condition threshold based on the second driving condition in determination block 706. Means for performing functions of the operations in block 706 may include the processor (e.g., 140*a*, 303, 304, 308, 310, 317, 402).

In response to determining that the first driving condition does not exceed the condition threshold based on the second driving condition (i.e., determination block 706="No"), the processor may perform the operations of block 602 (FIG. 6).

In response to determining that the first driving condition exceeds the condition threshold based on the second driving condition (i.e., determination block 706="Yes"), the processor may determine the driving condition anomaly in block 708.

The processor may then perform the operations of block 606 (FIG. 6) as described.

Figure 7C:
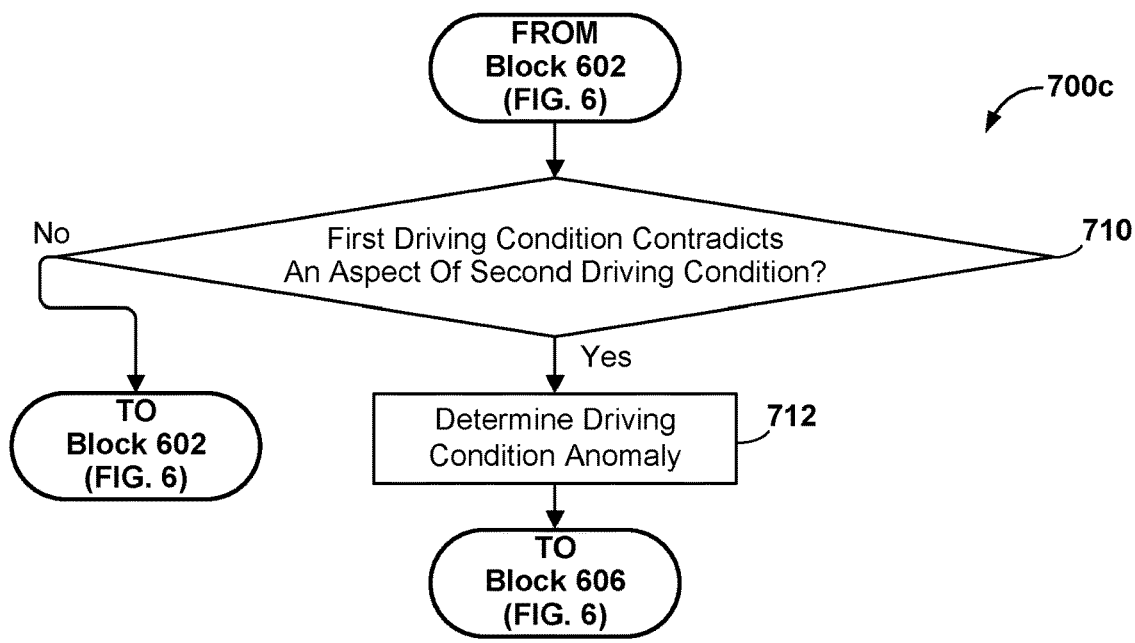

Referring to FIG. 7C, the operations 700c illustrate an example of operations that may be performed to determine a driving condition anomaly in a second driving condition resulting from or based on a first driving condition. Following the performance of block 603 (FIG. 6), the processor may determine whether the first driving condition contradicts an aspect of the second driving condition in determination block 710. Means for performing functions of the operations in block 710 may include the processor (e.g., 140a, 303, 304, 308, 310, 317, 402).

In response to determining that the first driving condition does not contradict an aspect of the second driving condition (i.e., determination block 710="No"), the processor may perform the operations of block 602 (FIG. 6).

In response to determining that the first driving condition contradicts an aspect of the second driving condition (i.e., determination block 710="Yes"), the processor may determine the driving condition anomaly in block 712.

The processor may then perform the operations of block 606 (FIG. 6) as described.

Figure 7D:
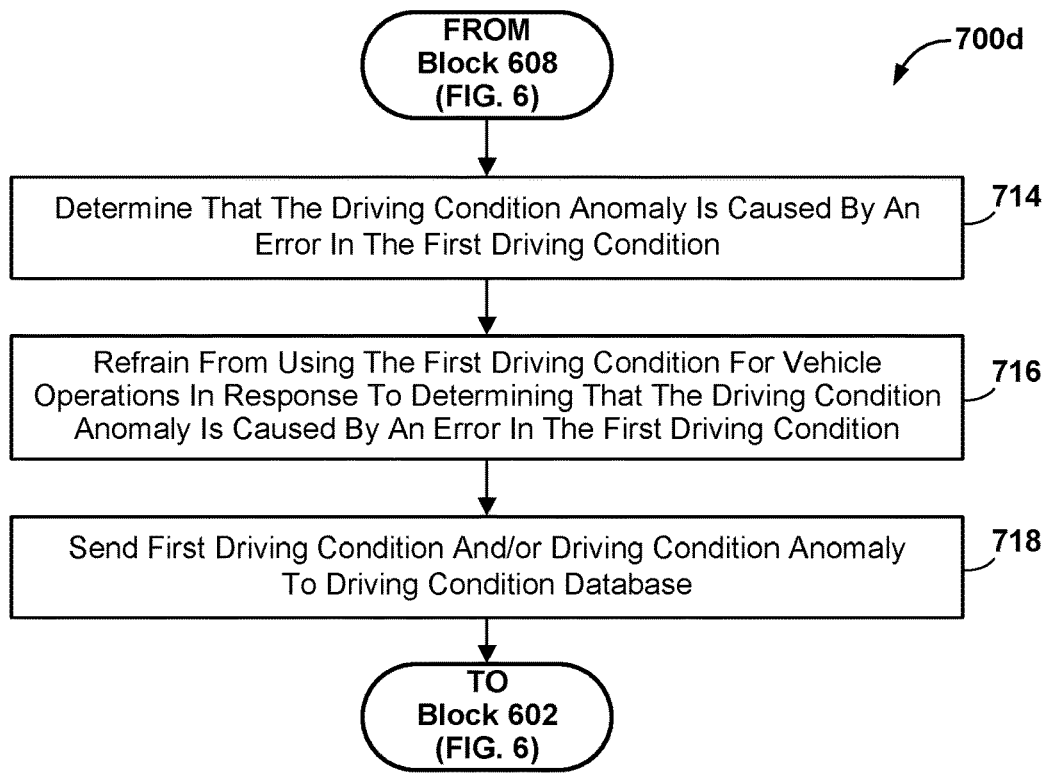

Referring to FIG. 7D, the operations 700d illustrate an example of operations that may be performed to resolve a driving condition anomaly. Following the performance of block 608 (FIG. 6), the processor may determine that the driving condition anomaly is caused by an error in the first driving condition in block 714. Means for performing functions of the operations in block 714 may include the processor (e.g., 140a, 303, 304, 308, 310, 317, 402).

In block 716, the processor may refrain from using the first driving condition for vehicle operations in response to determining that the anomaly is caused by an error in the first driving condition. Means for performing functions of the operations in block 714 may include the processor (e.g., 140a, 303, 304, 308, 310, 317, 402).

In block 718, the processor may send the first driving condition to the driving condition database. Additionally or alternatively, the processor may send the driving condition anomaly to the driving condition database. In some embodiments, the processor may determine whether to send the first driving condition and/or the driving condition anomaly to the driving condition database. For example, the processor may determine that the first driving condition and/or the driving condition anomaly may not be sufficiently serious or important to warrant reporting to the driving condition database. In some embodiments, the processor may determine that the first driving condition and/or the driving condition anomaly does not exceed a threshold level of deviation from the second driving condition, or from high-definition map data, or other information. In response to determining that the first driving condition and/or the driving condition anomaly exceeds the threshold level of deviation, the processor may send the first driving condition and/or the driving condition anomaly to the driving condition database. In response to determining that the first driving condition and/or the driving condition anomaly does not exceed the threshold level of deviation, the processor may refrain from sending the first driving condition and/or the driving condition anomaly to the driving condition database. Means for performing functions of the operations in block 718 may include the processor (e.g., 140a, 303, 304, 308, 310, 317, 402) and the wireless communication system (e.g., 230).

The processor may then perform the operations of block 602 (FIG. 6) as described.

Figure 7E:
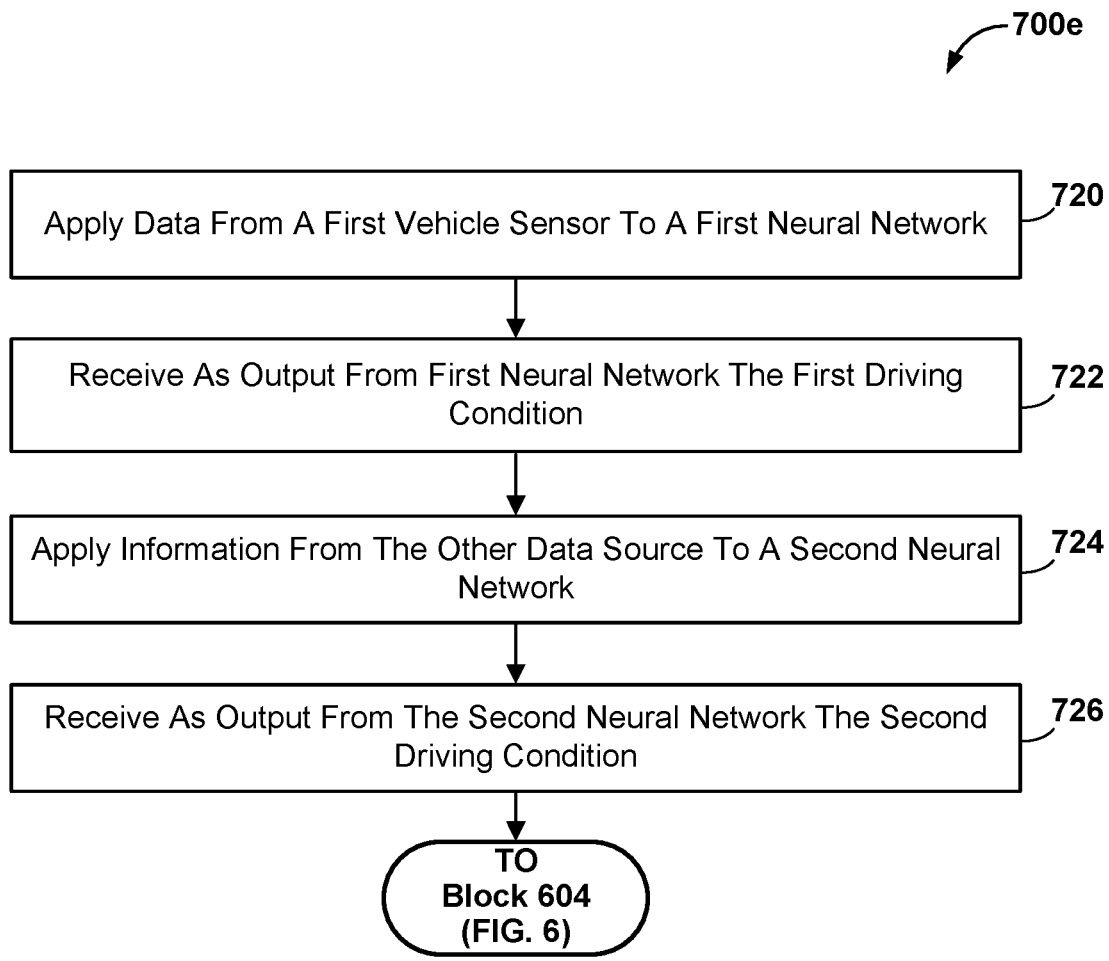

Referring to FIG. 7E, in some embodiments, as part of performing the operations of block 602 (FIG. 6), the processor may apply the data from a first vehicle sensor to a first neural network in block 720. Means for performing functions of the operations in block 720 may include the processor (e.g., 140a, 303, 304, 308, 310, 317, 402) and a sensor (e.g., 144-170, 172c).

In block 722, the processor may receive as output from the first neural network the first driving condition. Means for performing functions of the operations in block 722 may include the processor (e.g., 140a, 303, 304, 308, 310, 317, 402).

In block 724, the processor may apply information from the other data source to a second neural network. For example, the first neural network and the second neural network may be different types of neural networks. For example, the first neural network may be an image recognition algorithm, which may be more easily fooled or spoofed, and the second neural network may be a deep learning algorithm, which may be more resistant to being fooled or spoofed. Means for performing functions of the operations in block 724 may include the processor (e.g., 140a, 303, 304, 308, 310, 317, 402) and a sensor (e.g., 144-170, 172c).

In block 726, the processor may receive as output from the second neural network the second driving condition. Means for performing functions of the operations in block 726 may include the processor (e.g., 140a, 303, 304, 308, 310, 317, 402).

The processor may then perform the operations of block 604 (FIG. 6) as described.

Figure 8:
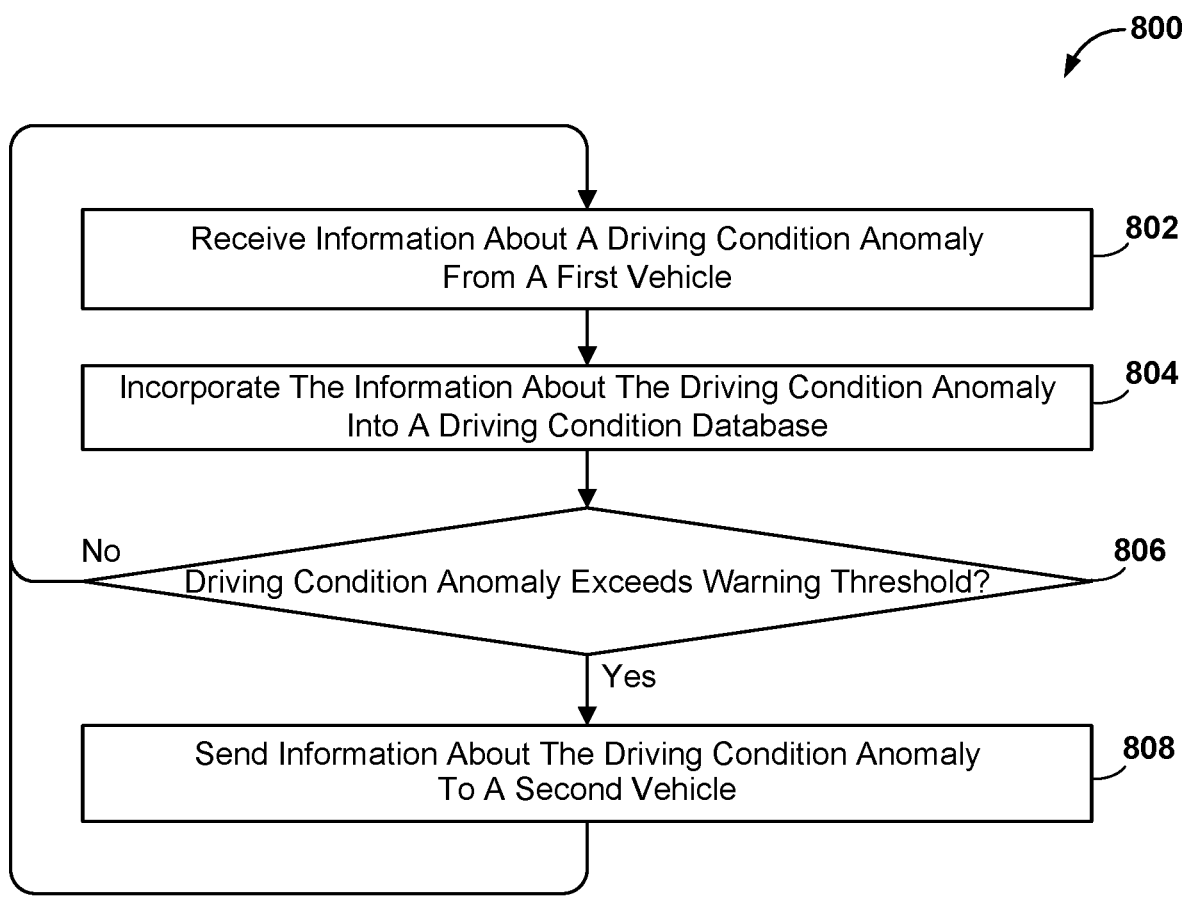
FIG. 8 is a process flow diagram illustrating operations performed by a processor of Edge computing device of a method for managing a driving condition anomaly in accordance with various embodiments.

FIG. 8 is a process flow diagram illustrating operations of a method 800 performed by an Edge computing device for managing a driving condition anomaly in accordance with various embodiments. With reference to FIGS. 1-8, the operations of the method 800 may be performed by a processor (e.g., 434) of an Edge computing device (e.g., the Edge computing device 134a).

In block 802, the processor may receive information about a driving condition anomaly from a first vehicle (e.g., 120a-120e, 170a, 170b, 200, 320). Means for performing the operations of block 802 may include the processor (e.g., 434) and a communication interface (e.g., 444).

In block 804, the processor may incorporate the information about the driving condition anomaly into a driving condition database. Means for performing the operations of block 804 may include the processor (e.g., 434).

In determination block 806, the processor may determine whether the driving condition anomaly exceeds a warning threshold. In some embodiments, determining whether the driving condition anomaly exceeds the warning threshold may include determining whether the second vehicle is within a warning radius or warning area of the driving condition anomaly. In some embodiments, determining whether the driving condition anomaly exceeds the warning threshold may include determining whether the driving condition anomaly may not be sufficiently serious or important to warrant sending the information to the second vehicle. In some embodiments, the processor may determine whether the driving condition anomaly exceeds a threshold level of deviation from high-definition map data, information reported by one or more other vehicles, or other information. Means for performing the operations of determination block 806 may include the processor (e.g., 434).

In response to determining that the driving condition anomaly does not exceed the warning threshold (i.e., determination block 808="No"), the processor may refrain from sending the information about the driving condition anomaly to the second vehicle and then perform the operations of block 802 as described.

In response to determining that the driving condition anomaly exceeds a warning threshold and/or the threshold level of deviation (i.e., determination block 808="Yes"), the processor may send information about the driving condition anomaly to a second vehicle in block 808. Means for performing the operations of block 808 may include the processor (e.g., 434) and a communication interface (e.g., 444).

The processor may then perform the operations of block 802 as described.

Figure 9A:
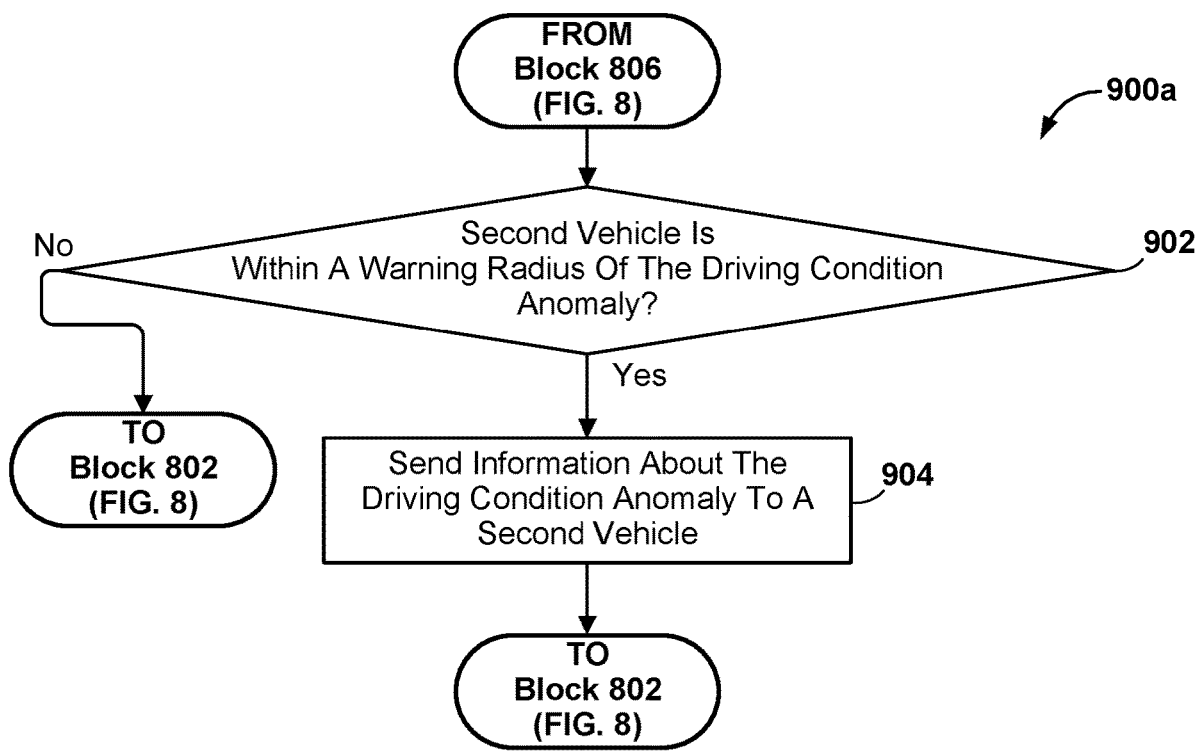
FIGS. 9A-9C are process flow diagrams illustrating operations that may be performed by a processor of an Edge computing device as part of the method for managing a driving condition anomaly in accordance with various embodiments.
Figure 9B:
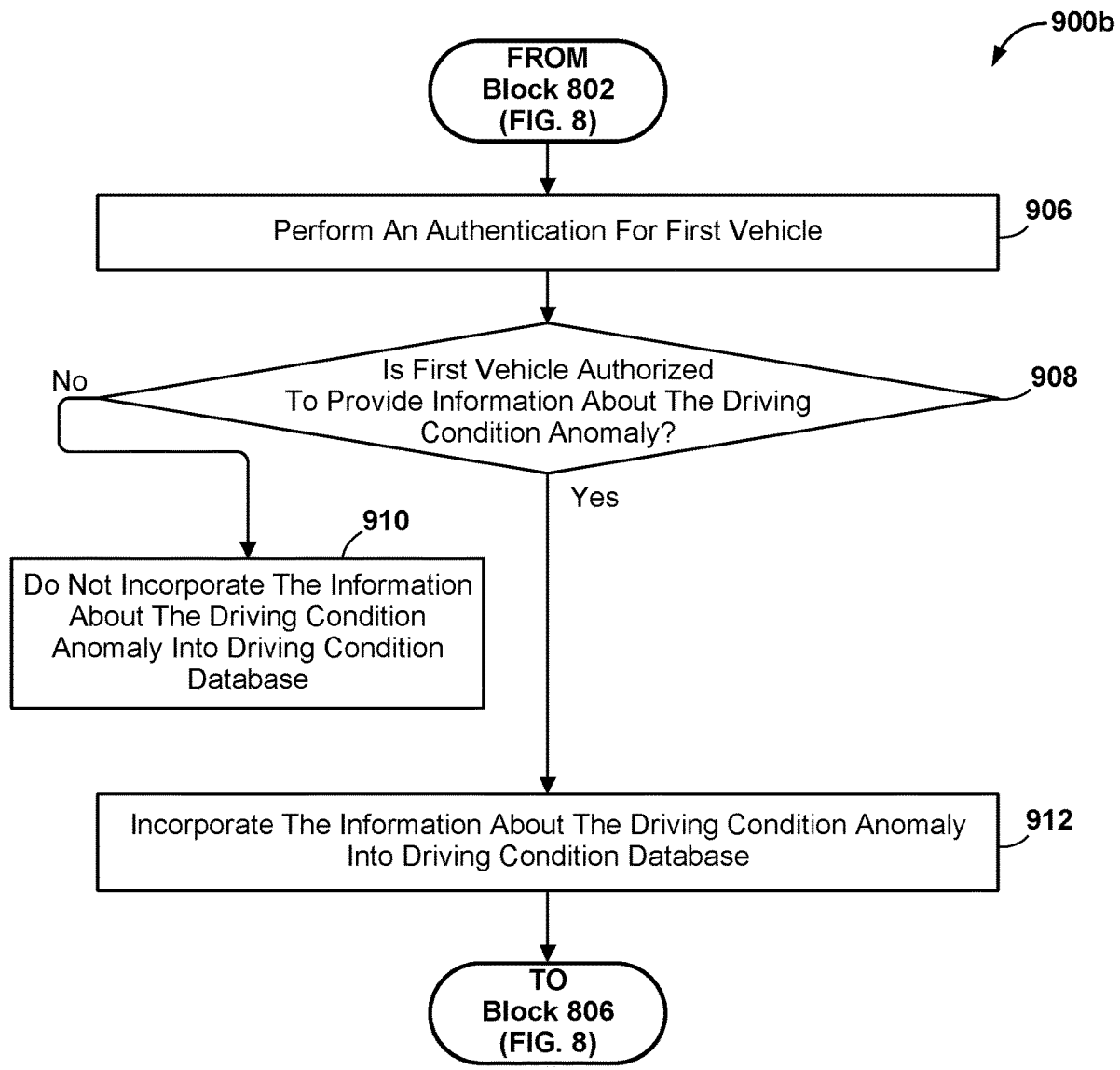

FIGS. 9A and 9B are process flow diagrams illustrating operations 900a and 900b that may be performed by a processor of an Edge computing device as part of the method 800 for managing a driving condition anomaly in accordance with various embodiments. With reference to FIGS. 1-9B, the operations 900a and 900b may be performed by a processor (e.g., 434) of an Edge computing device (e.g., the Edge computing device 134a).

Referring to FIG. 9A, the operations 900a illustrate an example of operations that may be performed to send information about a driving condition anomaly to a second vehicle. Following the performance of the operations of block 806 (FIG. 8), the processor may determine whether the second vehicle is within a warning radius of the driving condition anomaly in determination block 902. In some embodiments, the processor may determine whether the second vehicle is within an area (e.g., a metropolitan area, a county, a district, etc.) in which the driving condition anomaly has been reported. In some embodiments, the processor may determine whether the second vehicle is within a radius from the driving condition anomaly. In some embodiments, the processor may determine whether a planned path of the second vehicle is within a radius of the driving condition anomaly. In some embodiments, the processor may determine based on a speed of the second vehicle whether the second vehicle will enter a radius of the driving condition anomaly within a period of time. Means for performing the operations of determination block 902 may include the processor (e.g., 434).

In response to determining that the second vehicle is not within the warning radius of the driving condition anomaly (i.e., determination block 902="No"), the processor may perform the operations of block 802 (FIG. 8) as described.

In response to determining that the second vehicle is within the warning radius of the driving condition anomaly (i.e., determination block 902="Yes"), the processor may send the information about the driving condition anomaly to a second vehicle in block 904. Means for performing the operations of block 904 may include the processor (e.g., 434) and the communication interface (e.g., 444).

The processor may then perform the operations of block 802 (FIG. 8) as described.

Referring to FIG. 9B, the operations 900b illustrate an example of operations that may be performed to incorporate information about a driving condition anomaly into a driving condition database. Following the performance of the operations of block 802 (FIG. 8), the processor may perform an authentication operation for the first vehicle in block 906. In some embodiments, the first vehicle must present authentication credentials or log into a verified account in order to be permitted to provide the information about the driving condition anomaly. In some embodiments, performing an authentication for the first vehicle may include determining whether the first vehicle is already authorized to provide information that will be added to the driving condition database. For example, the first vehicle may have been authenticated previously, or recently (i.e., within a threshold period of time). Means for performing the operations of block 906 may include the processor (e.g., 434) and the communication interface (e.g., 444).

In determination block 908, the processor may determine whether the first vehicle is authorized to provide the information about the driving condition anomaly. In some embodiments, the processor may determine whether the first vehicle's authentication credentials are verified. Means for performing the operations of block 908 may include the processor (e.g., 434).

In response to determining that the first vehicle is not authorized to provide the information about the driving condition anomaly (i.e., determination block 908="No"), the processor may not incorporate the information about the driving condition anomaly into the driving condition database in block 910.

In response to determining that the first vehicle is authorized to provide the information about the driving condition anomaly (i.e., determination block 908="Yes"), the processor may incorporate the information about the driving condition anomaly into the driving condition database in block 912.

The processor may then perform the operations of block 806 (FIG. 8) as described.

Figure 9C:
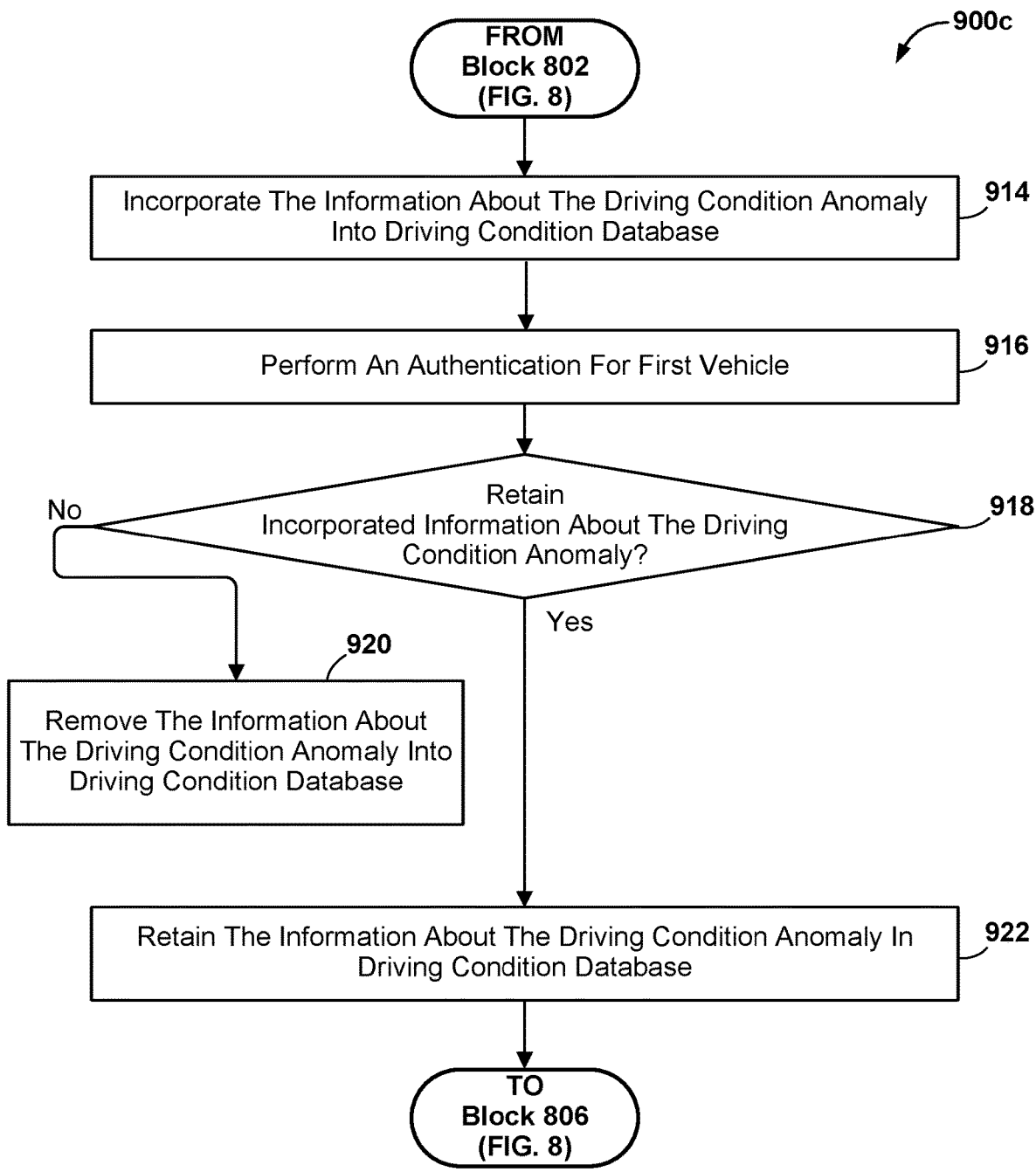

Referring to FIG. 9C, the operations 900c illustrate an example of operations that may be performed to incorporate information about a driving condition anomaly into a driving condition database. Following the performance of the operations of block 802 (FIG. 8), the processor may incorporate the information about the driving condition anomaly into the driving condition database in block 914. Means for performing the operations of block 914 may include the processor (e.g., 434).

The processor may then perform an authentication for the first vehicle in block 916. In some embodiments, the processor may incorporate the information into the driving condition database before performing the authentication for the first vehicle. In this manner, important driving condition information may be added to the database without delays associated with authenticating the source. For example, the operations for performing the authentication may require many steps or may require a relatively long time, while the driving condition information may be time critical (e.g., a report of an accident). As another example, a process of authentication before incorporating the information about the driving condition anomaly into the driving condition database (e.g., the operations of block 906, FIG. 9B) may have encountered an error or a difficulty. In some embodiments, the processor may determine that a risk of incorporating the information into the driving condition database before authenticating the vehicle providing the information is relatively low (e.g., a reported speed limit is only 1 MPH different than a known speed limit for that road or area). In some embodiments, performing an authentication for the first vehicle may include determining a reliability or verifying a functionality of a sensor or other equipment of the first vehicle that detected or determined the information about the driving condition anomaly. Means for performing the operations of block 916 may include the processor (e.g., 434) and the communication interface (e.g., 444).

In determination block 918, the processor may determine whether to retain the incorporated information about the driving condition anomaly (i.e., in the driving condition database) based on the results of authenticating the first vehicle. In some embodiments, the processor may determine whether the first vehicle is authorized to provide the information about the driving condition anomaly (e.g., based on authentication or login credentials), enabling the information to be retained if the first vehicle is authorized to provide the information or deleted if the vehicle is not authorized to provide the information. In some embodiments, the processor may determine whether the first vehicle sensor or other equipment that detected or determined the information about the driving condition anomaly is reliable, or that its proper operation can be verified. Means for performing the operations of block 906 may include the processor (e.g., 434) and the communication interface (e.g., 444).

In response to determining that the incorporated information about the driving condition anomaly should not be retained (i.e., determination block 918="No"), the processor may remove the information about the driving condition anomaly from the driving condition database in block 920. Means for performing the operations of block 920 may include the processor (e.g., 434) and the communication interface (e.g., 444).

In response to determining that the incorporated information about the driving condition anomaly should be retained (i.e., determination block 918="Yes"), the processor may retain the information about the driving condition anomaly in the driving condition database in block 922. In some embodiments, the operations in block 922 may involve moving the information from a temporary database storage to more permanent or trusted database storage or assigning an indication of trustworthiness to the information. Means for performing the operations of block 922 may include the processor (e.g., 434) and the communication interface (e.g., 444).

The processor may then perform the operations of block 806 (FIG. 8) as described.

Figure 10:
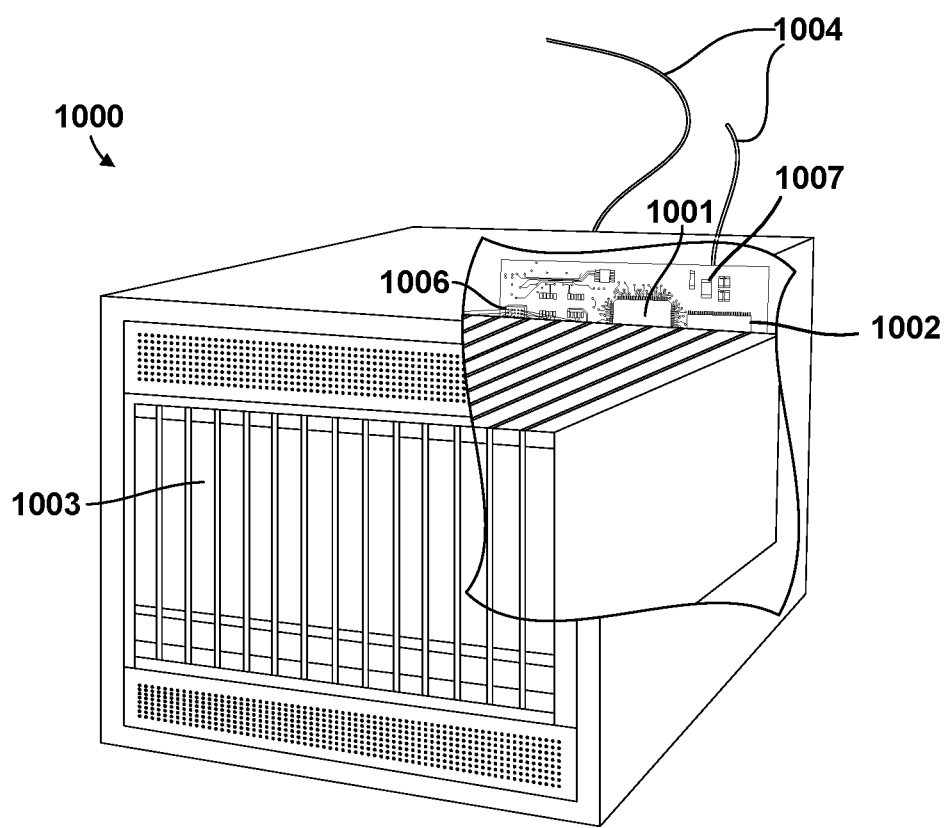
FIG. 10 is a component block diagram of an Edge computing device suitable for use with various embodiments.

Various embodiments may be implemented on a variety of network devices, an example of which is illustrated in FIG. 10 in the form of an Edge computing device 1000 functioning as a network element of a communication network, such as an Edge application server, an Edge enabler server, or an Edge data network configuration server. Such network computing devices may include at least the components illustrated in FIG. 10. With reference to FIGS. 1-10, the Edge computing device 1000 may typically include a processor 1001 coupled to volatile memory 1002 and a large capacity nonvolatile memory, such as a disk drive 1003. The Edge computing device 1000 may also include a peripheral memory access device such as a floppy disc drive, compact disc (CD) or digital video disc (DVD) drive 1006 coupled to the processor 1001. The Edge computing device 1000 may also include network access ports 1004 (or interfaces) coupled to the processor 1001 for establishing data connections with a network, such as the Internet and/or a local area network coupled to other system computers and servers. The Edge computing device 1000 may include one or more antennas 1007 for sending and receiving electromagnetic radiation that may be connected to a wireless communication link. The Edge computing device 1000 may include additional access ports, such as USB, Firewire, Thunderbolt, and the like for coupling to peripherals, external memory, or other devices.

The processors of the Edge computing device 1000 and a vehicle control unit 140 may be any programmable microprocessor, microcomputer or multiple processor chip or chips that can be configured by software instructions (applications) to perform a variety of functions, including the functions of the various embodiments described below. In some vehicle control units, multiple processors may be provided, such as one processor within an SOC 204 dedicated to wireless communication functions and one processor within an SOC 202 dedicated to running other applications, such as vehicle navigation and control functions. Typically, software applications may be stored in the memory 1002, 1003 before they are accessed and loaded into the processor. The processors may include internal memory sufficient to store the application software instructions.

A number of different cellular and mobile communication services and standards are available or contemplated in the future, all of which may implement and benefit from the various embodiments. Such services and standards include, e.g., third generation partnership project (3GPP), long term evolution (LTE) systems, third generation wireless mobile communication technology (3G), fourth generation wireless mobile communication technology (4G), fifth generation wireless mobile communication technology (5G), global system for mobile communications (GSM), universal mobile telecommunications system (UMTS), 3GSM, general packet radio service (GPRS), code division multiple access (CDMA) systems (e.g., cdmaOne, CDMA1020™), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), and integrated digital enhanced network (iDEN). Each of these technologies involves, for example, the transmission and reception of voice, data, signaling, and/or content messages. It should be understood that any references to terminology and/or technical details related to an individual telecommunication standard or technology are for illustrative purposes only, and are not intended to limit the scope of the claims to a particular communication system or technology unless specifically recited in the claim language.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations of the methods or operations 600, 700*a*, 700*b*, 700*c*, 700*d*, 700*e*, 800, 900*z*, 900*b*, and 900*c* may be substituted for or combined with one or more operations of the methods 600, 700*a*, 700*b*, 700*c*, 700*d*, 700*e*, 800, 900*z*, 900*b*, and 900*c*.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then,"

"next," etc. are not intended to limit the order of the operations; these words are used to guide the reader through the description of the methods. Further, any reference to claim elements in the singular, for example, using the articles "a," "an," or "the" is not to be construed as limiting the element to the singular.

Various illustrative logical blocks, modules, components, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the claims.

The hardware used to implement various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A method performed by a processor of a vehicle control unit for managing a driving condition anomaly, comprising:
   receiving a first driving condition based on data of a condition external to a vehicle received from a first vehicle sensor;
   receiving a second driving condition based on data of a condition external to the vehicle received from another data source;
   determining a driving condition anomaly based on the first driving condition and the second driving condition;
   sending a request for information to a driving condition database remote from the vehicle in response to determining the driving condition anomaly;
   receiving the requested information from the driving condition database;
   determining using the requested information from the driving condition database that the driving condition anomaly is caused by an error in the first driving condition; and
   resolving the driving condition anomaly in response to determining that the driving condition anomaly is caused by an error in the first driving condition.

2. The method of claim 1, wherein the first driving condition and the second driving condition each are selected from the group consisting of traffic sign information, traffic light information, a speed limit, a road condition, a traffic condition, observed behavior of a second vehicle, observed behavior of a person outside the vehicle, information from a navigation system, information from an electronic map, an instruction received from an autonomous maneuvering system of the vehicle, and an instruction received from an intelligent traffic system (ITS).

3. The method of claim 1, wherein the other data source comprises a high-definition map.

4. The method of claim 1, wherein the other data source comprises a second vehicle sensor of the vehicle.

5. The method of claim 1, wherein determining a driving condition anomaly based on the first driving condition and the second driving condition comprises determining the driving condition anomaly in response to determining that a difference between the first driving condition and the second driving condition exceeds a threshold.

6. The method of claim 1, wherein determining a driving condition anomaly based on the first driving condition and the second driving condition comprises determining the driving condition anomaly in response to determining that the first driving condition exceeds a condition threshold based on the second driving condition.

7. The method of claim 1, wherein determining a driving condition anomaly based on the first driving condition and the second driving condition comprises determining the driving condition anomaly in response to determining that the first driving condition contradicts an aspect of the second driving condition.

8. The method of claim 1, wherein resolving the driving condition anomaly based on the requested information from the driving condition database comprises:
refraining from using the first driving condition for vehicle operations in response to determining that the driving condition anomaly is caused by an error in the first driving condition.

9. The method of claim 1, further comprising sending the driving condition anomaly to the driving condition database.

10. The method of claim 1, wherein:
receiving a first driving condition based on data of a condition external to the vehicle received from the first vehicle sensor comprises:
applying the data from a first vehicle sensor to a first neural network;
receiving as output from the first neural network the first driving condition; and
receiving a second driving condition based on data of a condition external to the vehicle received from another data source comprises:
applying information from the other data source to a second neural network; and
receiving as output from the second neural network the second driving condition.

11. The method of claim 1, wherein sending a request for information to a driving condition database remote from the vehicle comprises sending to the driving condition database one or more of a location of the vehicle, a speed of the vehicle, a planned path of the vehicle, and a radius from the vehicle.

12. The method of claim 1, wherein sending a request for information to a driving condition database remote from the vehicle comprises sending the request for information to an Edge computing device.

13. The method of claim 1, further comprising resolving the driving condition anomaly based on the requested information from the driving condition database by reducing a weight associated with the first driving condition.

14. The method of claim 1, further comprising resolving the driving condition anomaly based on the requested information from the driving condition database by substituting the second driving condition for the first driving condition.

15. A vehicle control unit for use in a vehicle, comprising:
a processor is further configured with processor-executable instructions to:
receive a first driving condition based on data of a condition external to a vehicle received from a first vehicle sensor;
receive a second driving condition based on data of a condition external to the vehicle received from another data source;
determine a driving condition anomaly based on and the second driving condition;
send a request for information to a driving condition database remote from the vehicle in response to determining the driving condition anomaly;
receive the requested information from the driving condition database;
determining using the requested information from the driving condition database that the driving condition anomaly is caused by an error in the first driving condition; and
resolve the driving condition anomaly in response to determining that the driving condition anomaly is caused by an error in the first driving condition.

16. The vehicle control unit of claim 15, wherein the processor is further configured with processor-executable instructions such that the first driving condition and the second driving condition each are selected from the group consisting of traffic sign information, traffic light information, a speed limit, a road condition, a traffic condition, observed behavior of a second vehicle, observed behavior of a person outside the vehicle, information from a navigation system, information from an electronic map, an instruction received from an autonomous maneuvering system of the vehicle, and an instruction received from an intelligent traffic system (ITS).

17. The vehicle control unit of claim 15, wherein the processor is further configured with processor-executable instructions such that the other data source comprises one of a high-definition map or a second vehicle sensor.

18. The vehicle control unit of claim 15, wherein the processor is further configured with processor-executable instructions to determine a driving condition anomaly based on the first driving condition and the second driving condition by:
determining the driving condition anomaly in response to determining that a difference between the first driving condition and the second driving condition exceeds a threshold;
determining the driving condition anomaly in response to determining that the first driving condition exceeds a condition threshold based on the second driving condition; or
determining the driving condition anomaly in response to determining that the first driving condition contradicts an aspect of the second driving condition.

19. The vehicle control unit of claim 15, wherein the processor is further configured with processor-executable instructions to resolve the driving condition anomaly based on the requested information from the driving condition database by:
refraining from using the first driving condition for vehicle operations in response to determining that the driving condition anomaly is caused by an error in the first driving condition.

20. The vehicle control unit of claim 15, wherein the processor is further configured with processor-executable instructions to resolve the driving condition anomaly based on the requested information from the driving condition database by reducing a weight associated with the first driving condition.

21. The vehicle control unit of claim 15, wherein the processor is further configured with processor-executable instructions to resolve the driving condition anomaly based on the requested information from the driving condition database by substituting the second driving condition for the first driving condition.

22. The vehicle control unit of claim 15, wherein the processor is further configured with processor-executable instructions to send the driving condition anomaly to the driving condition database.

23. The vehicle control unit of claim 15, wherein the processor is further configured with processor-executable instructions to:

receive a first driving condition based on data of a condition external to a vehicle received from a first vehicle sensor data by:
 applying the data from a first vehicle sensor to a first neural network;
 receiving as output from the first neural network the first driving condition; and
receive a second driving condition based on data of a condition external to the vehicle received from another data source by:
 applying information from the other data source to a second neural network; and
 receiving as output from the second neural network the second driving condition.

24. The vehicle control unit of claim 15, wherein the processor is further configured with processor-executable instructions to send a request for information to a driving condition database remote from the vehicle by sending to the driving condition database one or more of a location of the vehicle, a speed of the vehicle, a planned path of the vehicle, and a radius from the vehicle.

\* \* \* \* \*